(12) United States Patent
Ogawa et al.

(10) Patent No.: US 8,064,328 B2
(45) Date of Patent: Nov. 22, 2011

(54) CHANNEL ESTIMATION DEVICE

(75) Inventors: Daisuke Ogawa, Kawasaki (JP);
Takashi Dateki, Kawasaki (JP); Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1092 days.

(21) Appl. No.: 11/896,990

(22) Filed: Sep. 7, 2007

(65) Prior Publication Data

US 2008/0112386 A1 May 15, 2008

(30) Foreign Application Priority Data

Nov. 15, 2006 (JP) ................................. 2006-308802

(51) Int. Cl.
*H04J 11/00* (2006.01)
(52) U.S. Cl. ...................................... 370/208; 370/480
(58) Field of Classification Search .................. 370/208, 370/480, 209–210; 375/259–267
See application file for complete search history.

(56) References Cited

U.S. PATENT DOCUMENTS

| | | | | |
|---|---|---|---|---|
| 7,352,730 B2 * | 4/2008 | Ghosh et al. | ................... | 370/338 |
| 7,355,960 B2 * | 4/2008 | Kang et al. | ................... | 370/208 |
| 7,412,005 B2 * | 8/2008 | Wang et al. | ................... | 375/260 |
| 7,519,122 B2 * | 4/2009 | Hayashi | ......................... | 375/260 |
| 7,889,799 B2 * | 2/2011 | Guey et al. | ................... | 375/260 |
| 2002/0164967 A1 * | 11/2002 | Miyoshi et al. | ............ | 455/226.1 |
| 2006/0013326 A1 | 1/2006 | Yoshida | | |
| 2006/0159006 A1 * | 7/2006 | Yeon et al. | ................... | 370/208 |
| 2007/0036232 A1 | 2/2007 | Hayashi | | |
| 2008/0031370 A1 * | 2/2008 | Guey et al. | ................... | 375/260 |
| 2008/0212727 A1 | 9/2008 | Jahan et al. | | |
| 2010/0104040 A1 * | 4/2010 | Seki | .............................. | 375/267 |

FOREIGN PATENT DOCUMENTS

| | | |
|---|---|---|
| JP | 2005-045628 | 2/2005 |
| JP | 2006-054840 | 2/2006 |
| WO | 2006/024312 | 3/2006 |
| WO | 2006/051036 | 5/2006 |

OTHER PUBLICATIONS

2006 General Conference of the Institute of Electronics, Information and Communication Engineers, B-5-94 "OFDM Channel Estimation by Adding a Virtual Frequency Response" Takashi Dateki, Daisuke Ogawa, Hideto Furukawa, Fujitsu Laboratories Ltd., pp. 447—English Translation pp. 1-5.

"On Channel Estimation in OFDM Systems", 1995 IEEE., pp. 815-819.

May 2004-2005 "Effect of Multi-Slot and Sub-Carrier Averaging Channel Estimation Filter in QRM-MLD for MIMO Multiplexing Using OFCDM", Technical Report of IEICE. RCS 20004-68.

(Continued)

*Primary Examiner* — Chuong T Ho
(74) *Attorney, Agent, or Firm* — Myers Wolin, LLC.

(57) ABSTRACT

A channel estimation device in wireless communication in use of a plurality of subcarriers for communication, comprises: a first channel estimation section which performs channel estimation for each subcarrier based on pilot signals mapped to each subcarrier; a second channel estimation section which further estimates channels for each subcarrier using channel estimation values estimated by the first channel estimation section; and a channel selection section, which selects and outputs the first and second channel estimation values estimated by the first and second channel estimation sections, according to the subcarrier.

17 Claims, 18 Drawing Sheets

OTHER PUBLICATIONS

The State Intellectual Property Office of China "First Notification of Office Action" for corresponding Chinese Patent Application No. 200710166845.8, issued Jul. 6, 2010. English translation attached.

Jan-Jaap van de Beek et al; "On Channel Estimation in OFDM Systems"; IEEE dated 1995.

Japanese Patent Office "Notification of Reason for Refusal" issued for corresponding Japanese Patent Application No. 2006-308802, dispatched Jul. 5, 2011. Partial English translation attached.

* cited by examiner

CHANNEL ESTIMATION DEVICE

BACKGROUND OF THE INVENTION

The present invention relates to a channel estimation device, and in particular relates to a channel estimation device in wireless communication in which a plurality of subcarriers are used for communication.

In wireless communication, transmission signals pass through a plurality of channels to arrive at a receiver. Consequently the signals observed by the receiver are waveforms with amplitude and phase distorted by multipath fading. As means of correcting such distortion, synchronous detection (channel compensation) using a pilot signal is employed. In a system which adopts the synchronous detection, a pilot signal is transmitted from a transmitter, and at a receiver the pilot signal is used to estimate multipath fading channel, and the channel estimation values are used in synchronous detection to demodulate data. At this time, if the error in channel estimation values is large, the result of data demodulation is affected, causing an increase in the data error rate.

On the other hand, in recent years numerous communication systems have used OFDM (Orthogonal Frequency Division Multiplexing), a characteristic of which is a high frequency utilization efficiency. OFDM (including OFDMA) is a multicarrier transmission method, which employs a plurality of orthogonal subcarriers, mapping transmission data onto the subcarriers for transmission. Normally, pilot signals are mapped onto a plurality of subcarriers similarly to data. As explained above, in synchronous detection these pilot signals are used to determine channel estimation values for each subcarrier, and the channel estimation values are employed to perform data demodulation.

FIG. 21 shows the configuration of a transmission device in an OFDM communication system; the data modulation portion 1 performs, for example, QPSK data modulation of transmission data including user data and control data), and converts the data to complex baseband signals referred to as symbols having an in-phase component and a quadrature component. The time-division multiplexing portion 2 performs time-division multiplexing of a plurality of pilot symbols into data symbols. The serial/parallel conversion portion 3 converts input data into N-symbol parallel data, and outputs N subcarrier samples. The IFFT (Inverse Fast Fourier Transform) portion 4 performs IFFT processing of N subcarrier samples input in parallel and merging the results for output as discrete-time signals (OFDM signal). The guard interval insertion portion 5 inserts guard intervals into the N-symbol portion of OFDM signals input from the IFFT portion, and the transmission portion (TX) 6 performs DA conversion of the OFDM signals with guard intervals inserted, converts the OFDM signal frequency from the baseband to the radio frequency band, performs high-frequency amplification, and transmits the signals from the antenna 7.

FIG. 22 shows the configuration of an OFDM reception device. Signals output from a transmission antenna 7 pass through a fading channel and are received by the reception antenna 8 of the reception device; the reception circuit (Rx) 9 converts the RF signals received by the antenna into baseband signals, and the baseband signals are AD converted into digital signals and output. The FFT timing synchronization circuit 10 detects the FFT timing of the time-domain signals output from the reception circuit 9, and the symbol extraction portion 11 deletes the GI and extracts OFDM symbols from the time-domain signals based on the FFT timing, and inputs the OFDM symbols to the FFT portion 12. The FFT portion 12 performs FFT processing for each extracted OFDM symbol consisted of N samples, converting this symbol into frequency-domain subcarrier samples $S_0$ to $S_{N-1}$. The channel estimation circuit 13 calculates the correlation between pilot signals received at fixed intervals and a known pilot pattern to perform channel estimation for each subcarrier, and the synchronous detection circuit (channel compensation circuit) 14 uses the channel estimation values for each subcarrier to perform demodulation of data symbols. By means of the above processing, transmission data distributed into each of the subcarriers is demodulated. Thereafter, the demodulated subcarrier signals, not shown, are converted into serial data and then decoded.

In the above explanation, it is assumed that the number of subcarriers for data mapping, the number of IFFT points, and the number of FFT points are equal; but in actuality, the number of subcarriers for data mapping is smaller than the number of IFFT points and the number of FFT points. The reason for this is as follows.

If N data items are subjected to N-point IFFT processing as components of N subcarriers $f_1$ to $f_N$, then the frequency spectrum is as shown in (A) of FIG. 23. In OFDM, an IFFT-processed signal is analog-converted, and a low-pass filter is used to extract the $f_1$ to $f_N$ baseband signal components from the analog signal, which are up-converted to the radio frequency and transmitted. In order to select these $f_1$ to $f_N$ baseband signal components, a low-pass filter having a sharp cutoff characteristic is necessary, as is clear in (A) of FIG. 23; fabrication of such a filter is difficult. Hence as shown in (B) of FIG. 23, the carriers on either side of the N subcarriers $f_1$ to $f_N$ are not used, that is, Nc subcarriers (Nc<N) are used for data transmission.

In addition to the above-described technique of the prior art, various other methods have been proposed as channel estimation methods used in a channel estimation circuit 13. The first of these methods is a channel estimation method characterized by conversion of a frequency-domain pilot signal into the time domain, followed by noise suppression processing in the time domain, and then reconversion into the frequency domain (see the first and second references: Takashi Dateki et al, "ODFM channel estimation by adding a virtual channel frequency response", 2006 Nat'l Conv. Rec. IEICE, B-5-94, and J. J. Beek et al, "On channel estimation in OFDM systems", Proc. 45th IEEE Vehicular Technology Conference, Chicago, Ill., USA, July 1995, pp. 815-819). A second method is a channel estimation method in which the pilot is averaged in the subcarrier direction and time-axis direction and channel estimation is performed for each subcarrier (the third reference: see Kawai et al, "Effect of multi-slot and subcarrier averaging channel estimation filter in QRM-MLD for MIMO multiplexing using OFDCDM", IEICE Tech. Rep., RCS2004-68, May 2004).

FIG. 24 shows the configuration of a channel estimation device which realizes the above-described first channel estimation method; two channel estimation portions 21, 22 are connected in series. The first channel estimation portion 21 is a channel estimation portion comprising the configuration of the prior art explained in FIG. 22; by calculating the correlation between received pilot signals and a known pilot pattern with a fixed period, channel estimation is performed for each subcarrier. The second channel estimation portion 22 converts the channel estimation values output by the first channel estimation portion 21 into the time domain, performs noise-suppression processing in the time domain, and then returns the signals to the frequency domain and outputs channel estimation values for each subcarrier. That is, the IFFT portion 22a uses IFFT to convert frequency-domain channel estimation values output from the first channel estimation portion 21 into the time domain, the noise-suppression portion 22b eliminates noise at or below a preset level from the time-domain channel estimation values, and the FFT portion 22c returns the noise-suppressed time-domain channel estimation values to the frequency domain and outputs frequency-domain channel estimation values (channel estimation values for each subcarrier). The IFFT and FFT can also be configured using IDFT (Inverse Discrete Fourier Transform) and DFT, or using IDCT (Inverse Discrete Cosine Transform) and DCT.

In the first channel estimation method of the prior art, a constant noise level is suppressed, so that in general the channel estimation values for subcarriers at center of the frequency domain are improved, but the precision of subcarriers at both ends worsens. FIG. 25 shows the MSE (Mean Square Error) for each subcarrier. The MSE is a value obtained by determining the difference between a power of the signal received by way of a known channel h and a power of the signal received by say of an estimated channel h', and changing the known channel variously to determine a plurality of power differences, which are averaged. As is clear from FIG. 25, the MSE of the subcarriers at both ends is degraded, that is, the channel estimation value is degraded; consequently there is the problem that the data error rates for the subcarriers at both ends are degraded compared with the data error rates for subcarriers near the center. The reason for this is as follows.

Consider the time-domain square wave shown in (A) of FIG. 26. When the Fourier transform of such a square wave is taken, a sinc function is obtained. This sinc function has an infinite interval, and so frequency components extend to infinity. That is, the time-domain square wave can be represented by sine waves of frequencies extending to infinity. However, as shown in (B) of FIG. 26, consider a case in which the sinc function is set to 0 at and above a certain frequency (so that there are only finite frequency components). If after such an approximation an inverse Fourier transform is performed to return to the time domain, the square wave can no longer be accurately represented. In particular, near the points at which the square wave changes rapidly, that is near the points at which the value of the square wave changes from 0 to 1 and from 1 to 0, accurate representation is no longer possible.

In the first channel estimation method of the prior art, time-domain signals are sinc function signals, and in order to suppress noise, the signal is set to 0 at and below a certain threshold. The above-described phenomenon occurs due to this operation, and distortion occurs in subcarriers at both ends of the communication band, so that the MSE is degraded. In the case of the first channel estimation method, the time-domain signals are sinc signals, but the only difference is that t and f in FIG. 26 are interchanged, and the same result is obtained.

By means of the second channel estimation method of the prior art, the influence of noise is eliminated and the S/N ratio is improved, but there is the problem that the noise suppression effect is small.

SUMMARY OF THE INVENTION

Hence an object of the invention is to provide a channel estimation device, comprising a plurality of channel estimation sections, which performs channel estimation in each channel estimation section, selects channel estimation values with good precision for each subcarrier, and improves the data error rate.

A further object of the invention is to provide a channel estimation device which has a large noise suppression effect, and moreover improves the channel estimation values for the subcarriers at both ends, enabling improvement of data error rates.

A further object of the invention is to provide a channel estimation device which enables determination of channel estimation values for all subcarriers without mapping pilot symbols to all subcarriers, and which can suppress noise and obtain high-precision channel estimation values.

A further object of the invention is to provide a channel estimation device which can execute adaptive control of the number of subcarriers at both ends according to the multipath delay spread, reception SIR, terminal movement velocity, and other characteristic values, and which can improve channel estimation values in subcarriers at both ends and improve the data error rate.

This invention relates to a channel estimation device, in wireless communication in which a plurality of subcarriers are used for communication.

A first channel estimation device of the invention comprises: a first channel estimation section, which performs channel estimation for each subcarrier based on pilot signals mapped to each subcarrier; a second channel estimation section, which further estimates channels for each subcarrier using channel estimation values obtained by the first channel estimation section; and a channel selection section, which selects and outputs the first and second channel estimation values estimated by the first and second channel estimation sections, according to the subcarrier.

In this first channel estimation device, the second channel estimation section includes: a first conversion section, which converts channel estimation values estimated by the first channel estimation section into time-domain channel estimation values; a noise suppression section, which suppresses noise included in time-domain channel estimation values; and a second conversion section, which converts noise-suppressed time-domain channel estimation values into frequency-domain channel estimation values.

In the first channel estimation device, when the first channel estimation section estimates channels of subcarriers at intervals of a prescribed number of subcarriers, the second channel estimation section includes a first conversion section, which converts the channel estimation values estimated by the first channel estimation section into time-domain channel estimation values; a zero-insertion section, which inserts a prescribed number of zeros into the vicinity of the center of the time-domain channel estimation values; and a second conversion section, which converts the time-domain channel estimation values with zeros inserted into frequency-domain channel estimation values.

In the first channel estimation device, when the first channel estimation section estimates channels of subcarriers at intervals of a prescribed number of subcarriers, the second channel estimation section includes: a first conversion section, which converts the channel estimation values estimated by the first channel estimation section into time-domain channel estimation values; a noise-suppression section, which suppresses noise included in the time-domain channel estimation values; a zero-insertion section, which inserts a prescribed number of zeros into the vicinity of the center of the noise-suppressed time-domain channel estimation values; and a second conversion section, which converts the time-domain channel estimation values with zeros inserted into frequency-domain channel estimation values.

In the first channel estimation device, the channel selection section selects channel estimation values estimated by the first channel estimation section as channel estimation values for subcarriers at both ends of the effective band, selects, as channel estimation values for subcarriers other than the subcarriers at both ends of the effective band, the channel estimation values estimated by the second channel estimation section, and outputs these values. In this case, the channel selection section uses a constant number of subcarriers at both ends of the effective band.

The channel selection section estimates a prescribed characteristic value, determines the number of subcarriers at both ends of the effective band based on the estimated characteristic value, selects channel estimation values estimated by the first channel estimation section as channel estimation values for the number of subcarriers determined in this way at both ends of the effective band, and selects channel estimation values estimated by the second channel estimation section as channel estimation values for subcarriers other than the subcarriers at both ends of the effective band.

A second channel estimation device of the invention comprises a first channel estimation section, which uses pilot signals mapped to each subcarrier to estimate channels for each subcarrier based on a first channel estimation method; a second channel estimation section, which uses pilot signals mapped to each subcarrier to estimate channels for each subcarrier based on a second channel estimation method different from the first channel estimation method; and, a channel selection section, which selects and outputs the first and second channel estimation values estimated by the first and second channel estimation sections, according to the subcarrier.

In the second channel estimation device, the channel selection section selects channel estimation values estimated by the first channel estimation section as channel estimation values for a constant number of subcarriers at both ends of the effective band, selects as channel estimation values for subcarriers other than the subcarriers at both ends of the effective band the channel estimation values estimated by the second channel estimation section, and outputs these values.

The channel selection section estimates a prescribed characteristic value, determines the number of subcarriers at both ends of the effective band based on the estimated characteristic value, selects channel estimation values estimated by the first channel estimation section as channel estimation values for the number of subcarriers determined in this way at both ends of the effective band, and selects channel estimation values estimated by the second channel estimation section as channel estimation values for subcarriers other than the subcarriers at both ends of the effective band.

By means of this invention, a plurality of channel estimation sections are provided, channels are estimated by each channel estimation section, and a channel estimation value with good precision is selected for each subcarrier, so that data error rates can be improved.

By means of this invention, channel estimation values estimated by the first channel estimation section are converted into time-domain channel estimation values, noise included in time-domain channel estimation values is suppressed, and the noise-suppressed time-domain channel estimation values are converted into frequency-domain channel estimation values, so that the noise suppression effect can be enhanced, and consequently channel estimation values can be improved and data error rates can be improved.

By means of this invention, channel estimation values estimated by the first channel estimation section are converted into time-domain channel estimation values, a prescribed number of zeros are inserted into the vicinity of the center of the time-domain channel estimation values, and the time-domain channel estimation values with zeros inserted are converted into frequency-domain channel estimation values, so that even when pilot symbols are not mapped to all subcarriers, a large noise-suppression effect can be obtained, and consequently the channel estimation values can be improved and data error rates can be improved.

By means of this invention, channel estimation values estimated by the first channel estimation section are converted into time-domain channel estimation values, noise included in the time-domain channel estimation values is suppressed, a prescribed number of zeros are inserted into the vicinity of the center of the noise-suppressed time-domain channel estimation values, and the time-domain channel estimation values with zeros inserted are converted into frequency-domain channel estimation values, so that even when pilot symbols are not mapped to all subcarriers, a large noise-suppression effect can be obtained, and consequently the channel estimation values can be improved and data error rates can be improved.

By means of this invention, the channel selection section selects, as channel estimation values for subcarriers on both ends of the effective band, channel estimation values estimated by the first channel estimation section, selects, as channel estimation values for subcarriers other than subcarriers at both ends of the effective band, channel estimation values estimated by the second channel estimation section, and outputs the values, so that channel estimation values of subcarriers at both ends of the effective band can be improved and data error rates can be improved.

By means of this invention, adaptive control of the number of subcarriers at both ends of the effective band is executed according to the multipath delay spread, reception SIR, terminal movement velocity, and other characteristic values, the channel estimation values in subcarriers at both ends can be improved and data error rates can be improved.

Other features and advantages of the present invention will be apparent from the following description, taken in conjunction with the accompanying drawings.

DESCRIPTION OF THE PREFERRED EMBODIMENTS (A) Principle of the Invention

Figure 24:
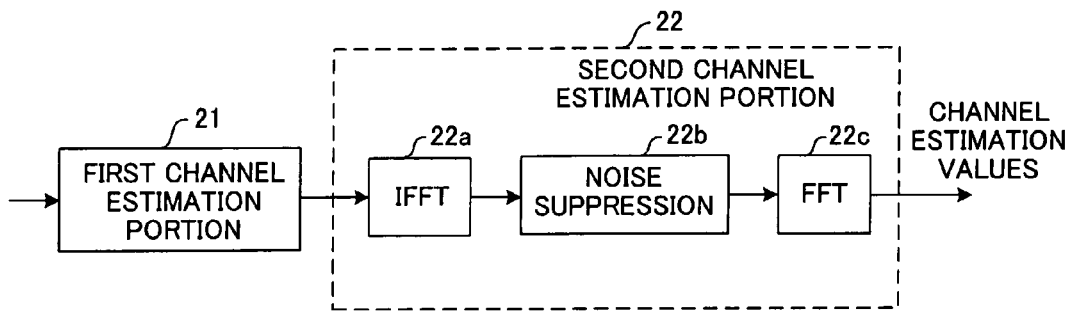
FIG. 24 shows the configuration of a channel estimation device which realizes a first channel estimation method.
Figure 25:
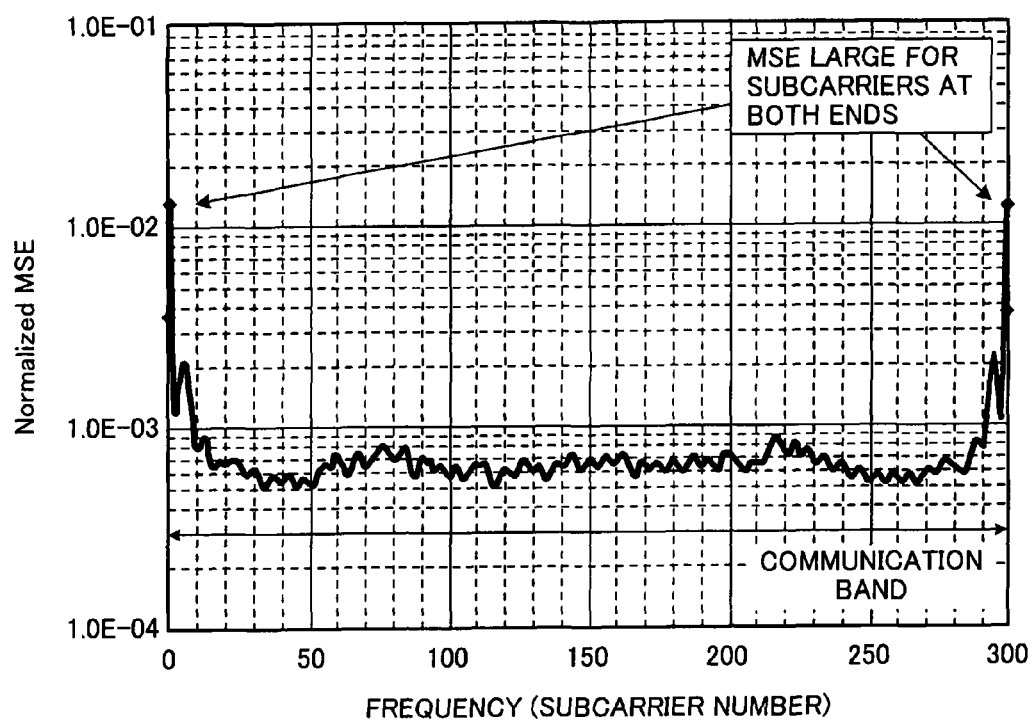
FIG. 25 explains the MSE (Mean Square Error) for each subcarrier in a channel estimation device of the prior art; and, FIG. 26 explains the reason for degradation of MSE using the first channel estimation method.
Figure 26:
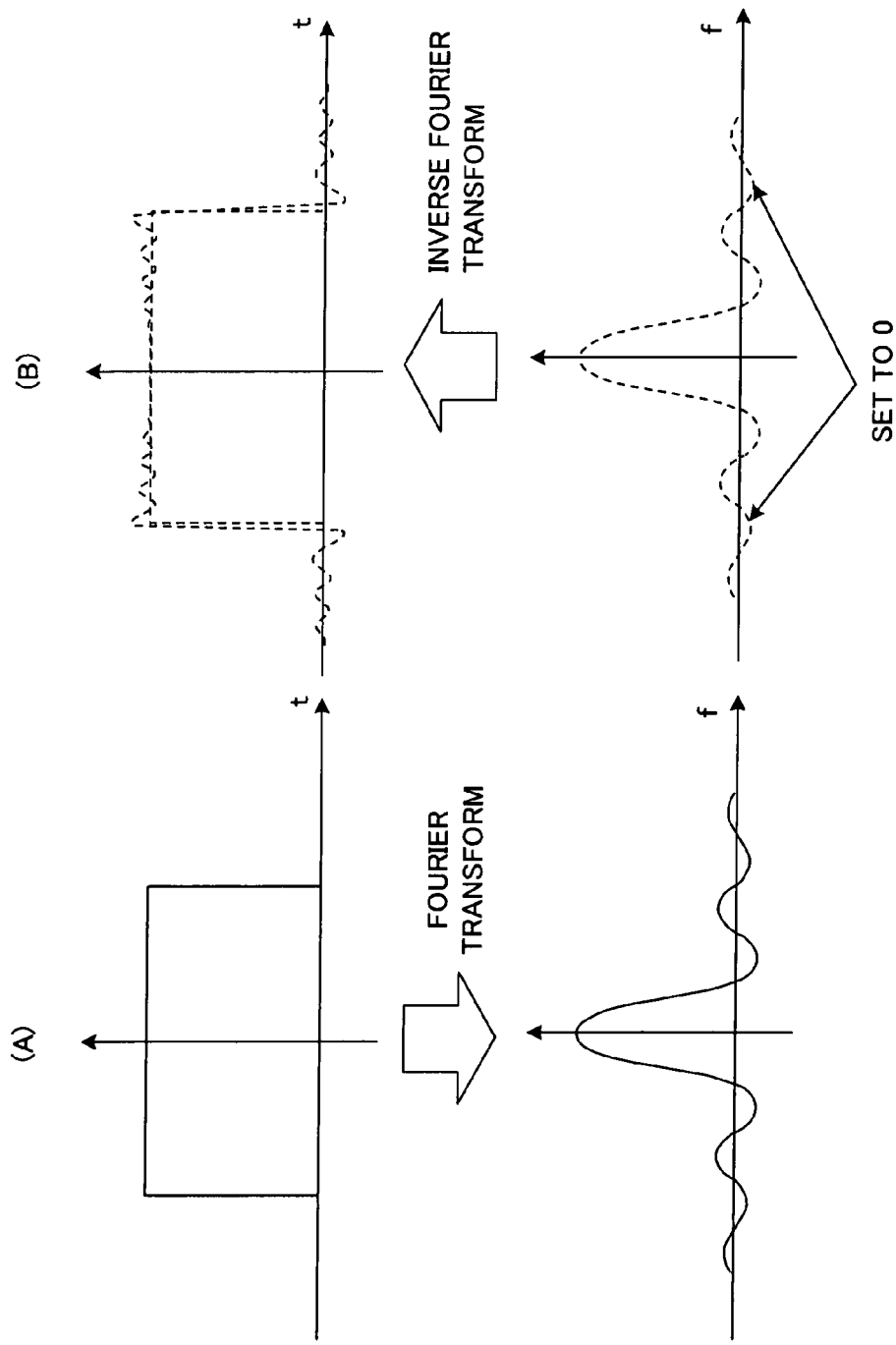

In the channel estimation method in which noise suppression is performed in the time domain in FIG. 24, the MSE of subcarriers at both ends is increased, and the precision of channel estimation values is degraded. By the way the MSE prior to noise elimination, that is, the MSE of the first channel estimation portion 21 in FIG. 24, is as indicated by the dashed line in FIG. 1, and is lower at the subcarriers at both ends than the MSE of the noise-suppressed second channel estimation portion 22.

Hence in this invention, as channel estimation values of subcarriers on both ends, channel estimation values before noise elimination are used, and as channel estimation values for other than subcarriers at both ends, the channel estimation values after noise elimination are used. By this means, the effect of noise suppression can be increased, and moreover the MSE of subcarriers at both ends, that is, the channel estimation values can be improved, and data error rates can be improved.

In this invention, a plurality of channel estimation portions are provided, and for each subcarrier, by selecting the channel estimation value output from the channel estimation portion for which the MSE is small, high-precision channel estimation is possible.

(B) First Embodiment

Figure 2:
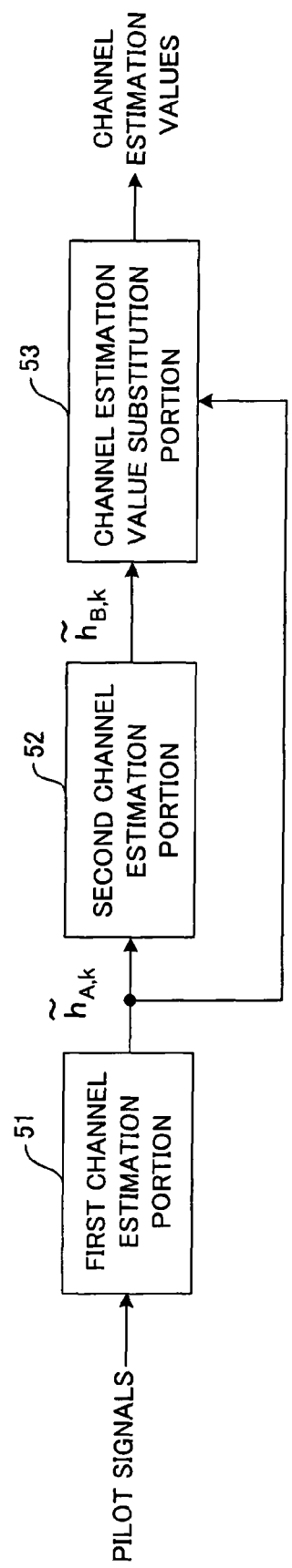
FIG. 2 shows the configuration of the channel estimation device of a first embodiment of the invention.

FIG. 2 shows the configuration of the channel estimation device of a first embodiment of the invention.

Pilot signals of $N_c$ subcarriers are input with prescribed timing to the first channel estimation portion 51, and channel estimation values $\tilde{h}_{A,k}$ (k=0, 1, ..., $N_c$-1) for each subcarrier are estimated and output.

These $N_c$ channel estimation values for the subcarriers are input to the second channel estimation portion 52, and $N_c$ channel estimation values $\tilde{h}_{B,k}$ (k=0, 1, ..., $N_c$-1) are estimated and output.

The channel estimation value substitution portion 53 basically selects channel estimation values output from the second channel estimation portion 52; but for prescribed subcarriers, channel estimation values output from the first channel estimation portion 51 are substituted for the channel estimation values output from the second channel estimation portion 52. That is, in prescribed subcarriers, when the MSE of the first channel estimation portion 51 is smaller than the MSE of the second channel estimation portion 52, the channel estimation value substitution portion 53 substitutes channel estimation values output from the first channel estimation portion 51 for channel estimation values output form the second channel estimation portion 52 for these subcarriers. The channel estimation value substitution portion 53 performs processing of the following equation where the number of a subcarrier for substitution is i.

$$\tilde{h}_{B,i} = \tilde{A}_{A,i} \quad (1)$$

It is possible to construct the channel estimation value substitution portion 53 so that it selects the channel estimation values output from the first channel estimation portion 51 for the said prescribed subcarriers, selects the channel estimation values output from the second channel estimation portion 52 for another subcarriers other than these subcarriers, and outputs the values.

Various methods exist for noise suppression processing in channel estimation. For example, as described in the first and second references, there are methods to perform noise suppression processing in the time domain, and as described in the third references, there are methods to perform noise suppression processing in the frequency domain. The second channel estimation portion 52 in the first embodiment may be configured so as to adopt either a method for noise suppression processing in the time domain, or a method for noise suppression processing in the frequency domain.

According to the first embodiment, two channel estimation portions, which are the first and second channel estimation portions are provided and the channel estimation value output from the channel estimation portion for which the MSE is smaller for each subcarrier is selected, so that high-precision channel estimation is possible.

First Modified Example

Figure 3:
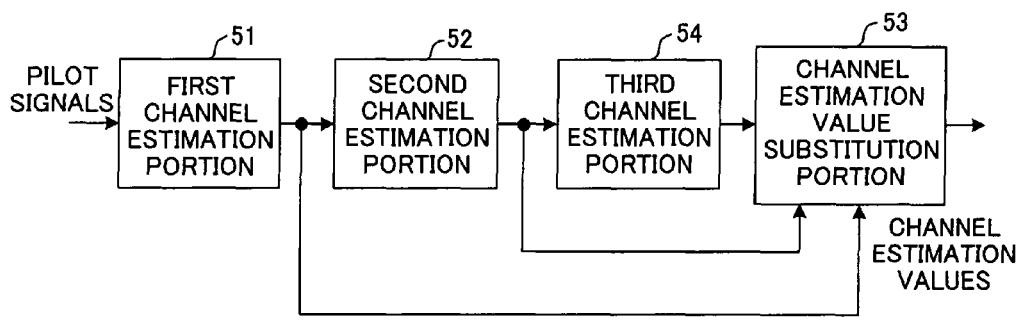
FIG. 3 shows the configuration of the channel estimation device of a first modified example.
Figure 4:
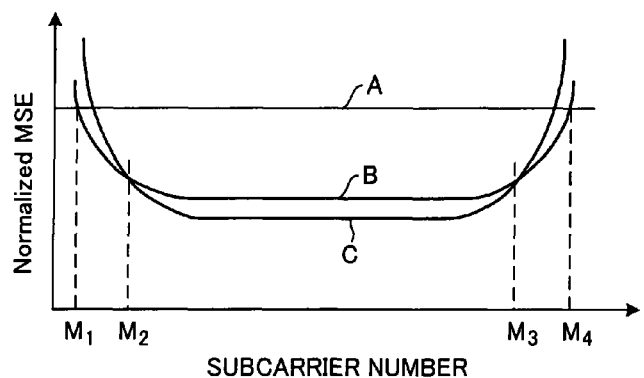
FIG. 4 explains operation of the first modified example.

In the first embodiment of FIG. 2, a configuration is employed having two channel estimation portions, which are a first channel estimation portion 51 and a second channel estimation portion 52; but as shown in FIG. 3, a configuration is possible having a plurality of channel estimation portions with a third channel estimation portion 54 further provided. In this case, the channel estimation value substitution portion 53 selects and outputs, for each subcarrier, a channel estimation value output from the channel estimation portion for which the MSE is lowest. For example, if the MSE for subcarriers of the first through third channel estimation portions 51, 52, 54 are represented by the characteristics A, B, C in FIG. 4, then the output from the channel estimation portion with smallest MSE is used, such that:

1) for subcarrier numbers M1 or lower, the output of the first channel estimation portion 51 is used;

2) for subcarrier numbers from M1 to M2, the output from the second channel estimation portion 52 is used;

3) for subcarrier numbers from M2 to M3, the output from the third channel estimation portion 53 is used;

4) for subcarrier numbers from M3 to M4, the output from the second channel estimation portion 52 is used; and, 5) for subcarrier numbers equal to or greater than M4, the output from the first channel estimation portion 51 is used.

In the case of the first embodiment of FIG. 2, the output of channel estimation portions with a small MSE is used, such that:

1) for subcarrier numbers M1 or lower, the output of the first channel estimation portion 51 is used;
2) for subcarrier numbers M1 to M4, the output of the second channel estimation portion 52 is used; and,
3) for subcarrier numbers equal to or greater than M4, the output of the first channel estimation portion 51 is used.

Second Modified Example

Figure 5:
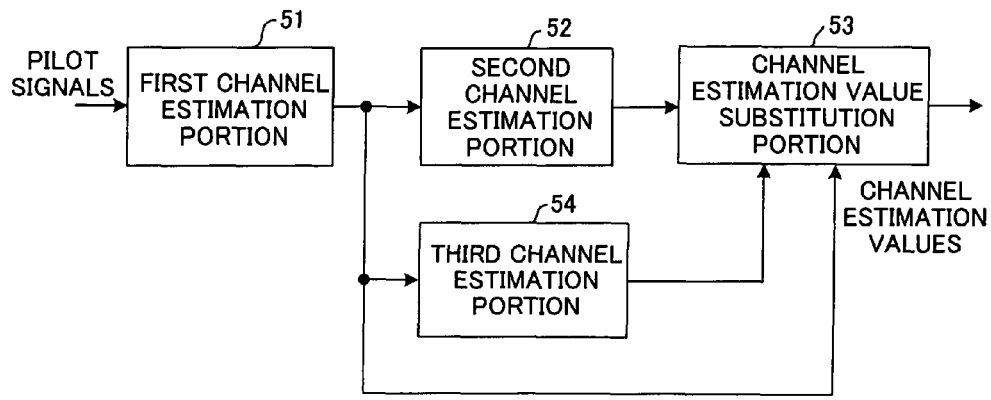
FIG. 5 shows the configuration of the channel estimation device of a second modified example.

In the first modified example, the second channel estimation portion 52 and third channel estimation portion 54 are connected in series; but a configuration can be employed in which these portions are connected in parallel, as shown in FIG. 5.

(C) Second Embodiment

Figure 6:
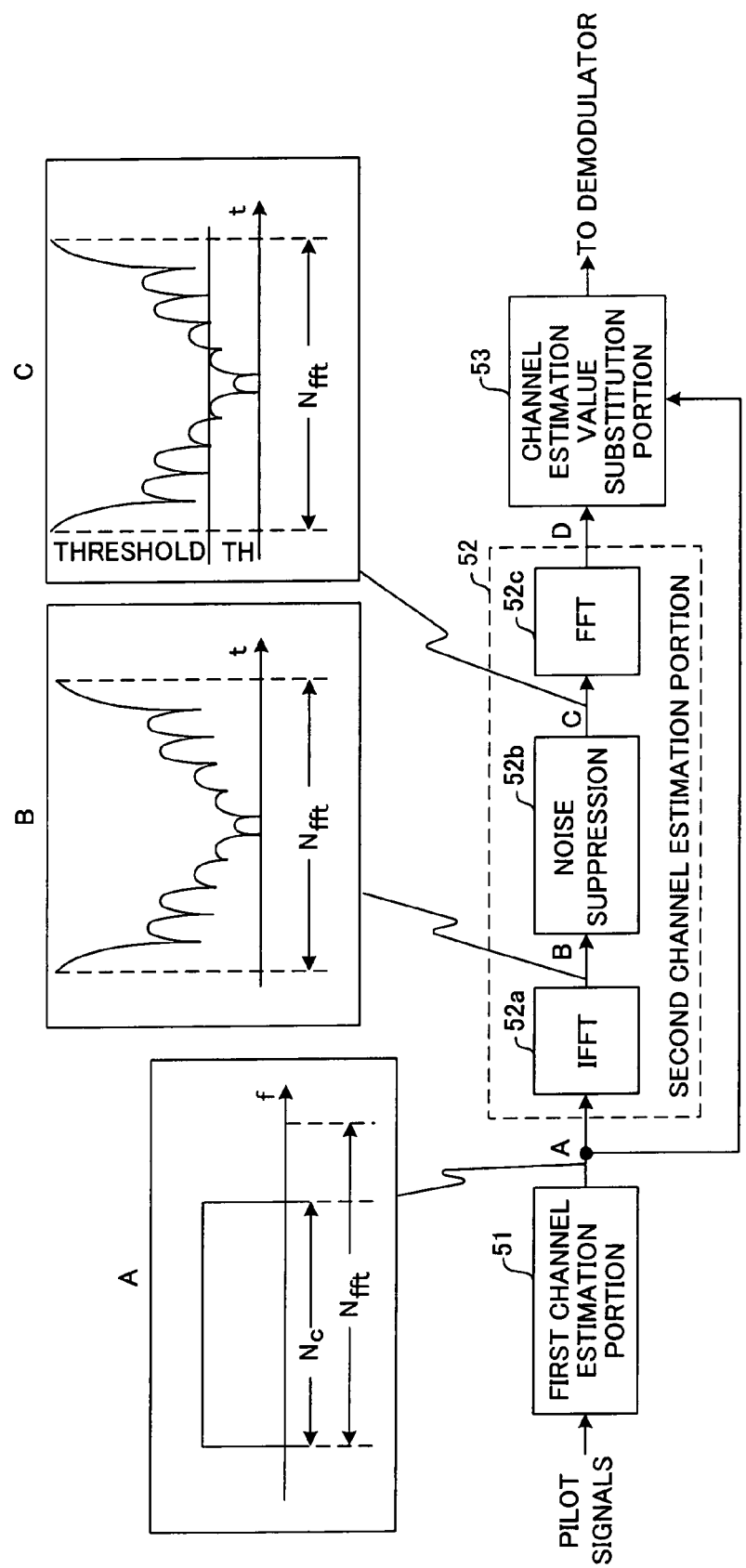
FIG. 6 shows the configuration of the channel estimation device of a second embodiment of the invention.

FIG. 6 shows the configuration of the channel estimation device of a second embodiment of the invention; in this example, as the noise suppression processing method, a method of noise suppression processing in the time domain is adopted, and is implemented in the second channel estimation portion 52 of the first embodiment. In FIG. 6, portions which are the same as in the first embodiment of FIG. 2 are assigned the same symbols.

The first channel estimation portion 51 estimates channel estimation values in the frequency domain for a number of effective subcarriers Nc and FFT window width Nfft, and inputs the results to the second channel estimation portion 52. The IFFT portion 52a of the second channel estimation portion 52 performs IFFT processing of the input frequency-domain channel estimation values A, converting the values to time-domain signal B. Here, the difference between the number of effective subcarriers Nc and FFT window width Nfft means a multiplication by a rectangular window on the frequency axis. As a result the time-domain signal B output from the IFFT is equivalent to a signal which is convoluted by a sinc function determined based on Nc and Nfft.

Next, the noise suppression portion 52b reduces to 0 the time-domain signals B output from IFFT which are at or below a threshold TH fixed in advance to suppress noise. The threshold TH is determined by the noise level. Finally, the FFT portion 52c performs FFT processing of signals C after noise suppression, to generate frequency-domain channel estimation values D, which are input to the channel estimation value substitution portion 53.

Figure 1:
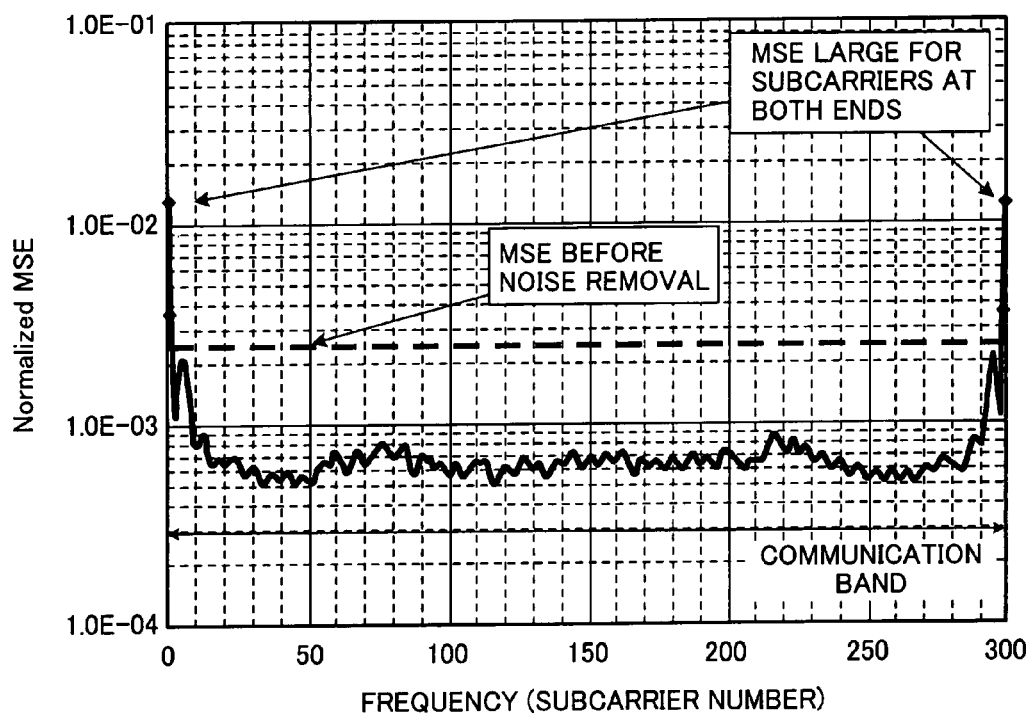
FIG. 1 shows MSE characteristics used to explain a principle of the invention.

Channel estimation values output from the second channel estimation portion 52 have channel estimation value precisions which are different for each subcarrier, as indicated in FIG. 1. For this reason, the channel estimation value substitution portion 53, similarly to the first embodiment, substitutes channel estimation values of the first channel estimation portion 51 for the channel estimation values output from the second channel estimation portion 52 for the subcarriers where the precision of the latter is presumed to be poor. That is, the channel estimation value substitution portion 53 selects and outputs channel estimation values output from the channel estimation portion with the smaller MSE. By this means, high-precision channel estimation is possible.

Channel Estimation Value Determination Method

The MSE of the second channel estimation portion 52 becomes large in subcarriers at both ends, as indicated by the solid line in FIG. 1, and the precision of channel estimation values is degraded. On the other hand, the MSE of the first channel estimation portion 51 is smaller in the subcarriers at both ends than the MSE of the second channel estimation portion 52, as indicated by the dashed line. Hence in the second embodiment, the channel estimation value substitution portion 53 outputs the channel estimation values estimated by the second channel estimation portion 52 for subcarriers other than the subcarriers at both ends, and outputs the channel estimation values estimated by the first channel estimation portion 51 for the subcarriers at both ends. Here, the number of subcarriers M at both ends can be determined in advanced as a fixed value. The number of subcarriers M can be determined by identifying the subcarriers for which the MSE of the first channel estimation portion 51 is smaller than the MSE of the second channel estimation portion 52.

Further, a configuration is possible in which the subcarriers for which the MSE of the first channel estimation portion 51 is smaller than the MSE of the second channel estimation portion 52 can be determined in advance and stored, and at such subcarriers the channel estimation value output by the first channel estimation portion 51 is selected, while at other subcarriers the channel estimation value output from the second channel estimation portion 52 is selected as the channel estimation value. This channel estimation value determination method can similarly be adopted in the other embodiments as well.

Simulation Results

Figure 7:
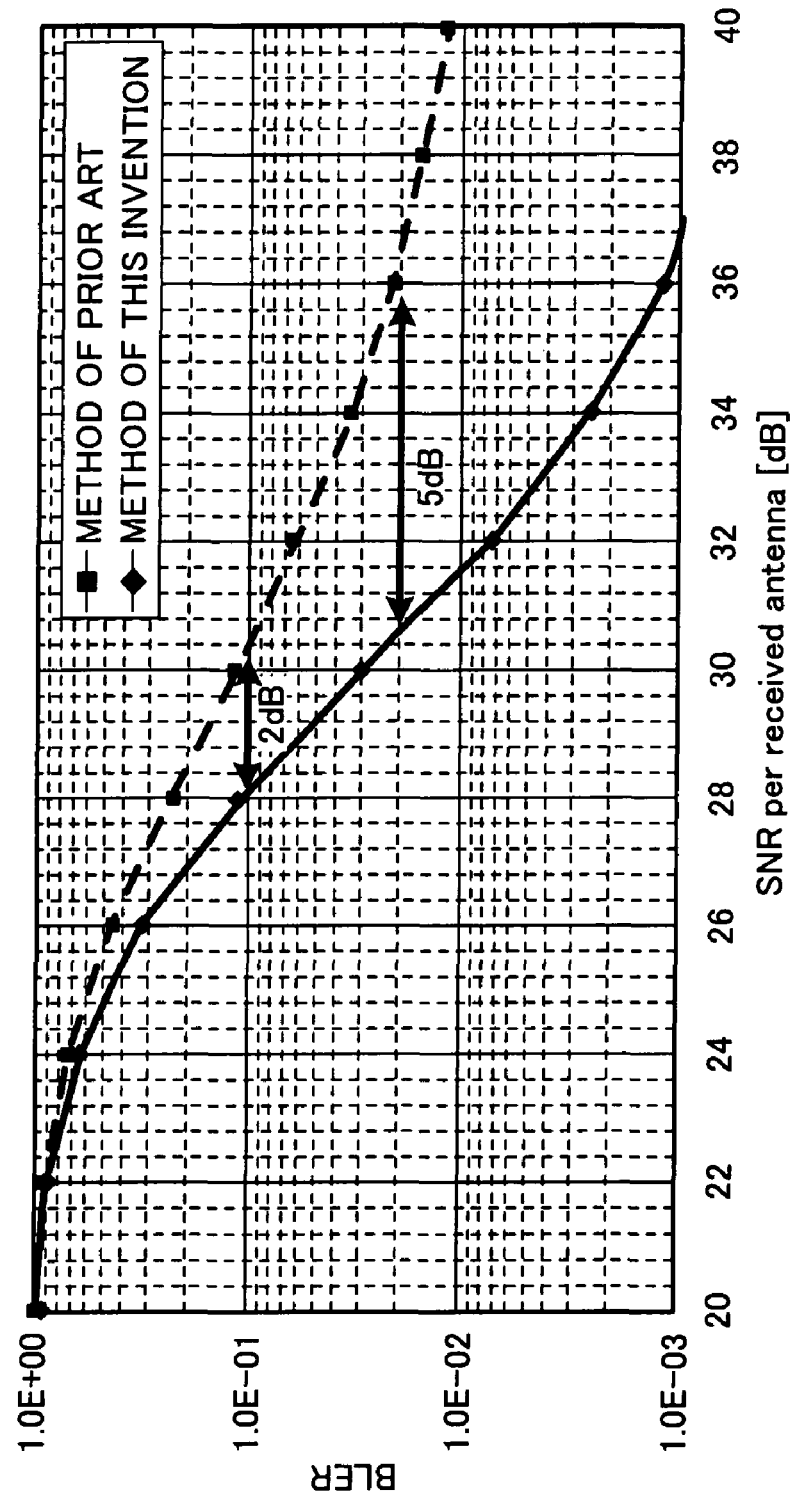
FIG. 7 shows the result of measurement of error rate characteristics for the second embodiment using a computer simulation.

FIG. 7 shows the results of measurements of error rate characteristics for the second embodiment using computer simulations. The horizontal axis indicates the SNR, and the vertical axis indicates the BLER (Block Error Rate), which is the number of errors per block. In simulations, the number of subcarriers on both are set to three. The transmission/reception method is assumed to be 2×2MIMO (2×2 Multiple Input Multiple Output), 64QAM, coding rate=¾, with a 6-ray Typical Urban Model propagation environment. From FIG. 7, it is seen that an improvement of approximately 2 dB in the required SNR for a BLER of 0.1, and an improvement of approximately 5 dB in the required SNR for a BLER of 0.02, are obtained.

(D) Third Embodiment

Figure 8:
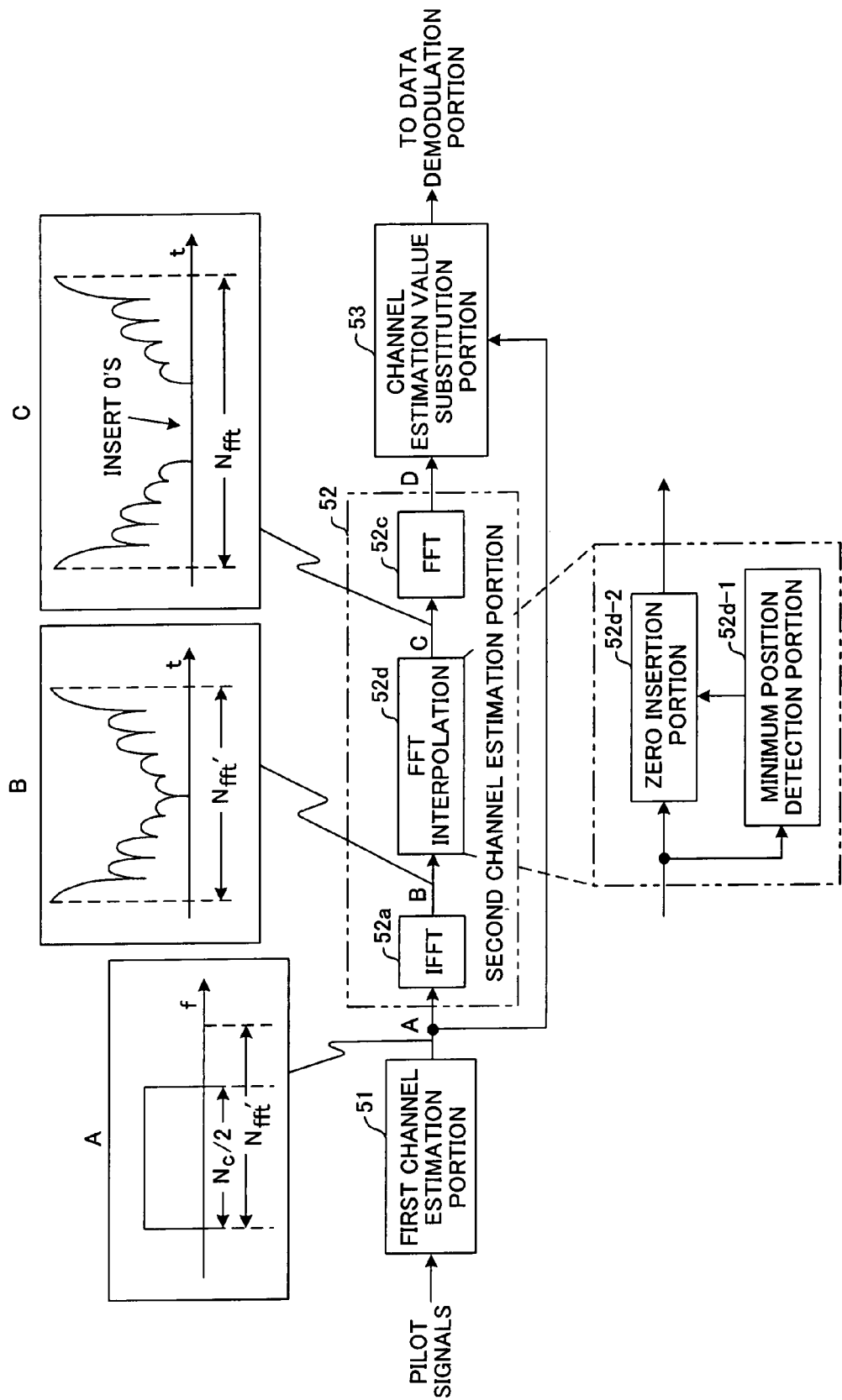
FIG. 8 shows the configuration of the channel estimation device according to a third embodiment of the invention.

FIG. 8 shows the configuration of the channel estimation device of a third embodiment of the invention; portions which are the same as in the first embodiment of FIG. 2 are assigned the same symbols. The third embodiment is an example of application to a case in which the number of subcarriers to which pilot symbols are mapped is small, and is characterized by performing FFT interpolation.

Below, a third embodiment is explained, assuming that the number of effective carriers is Nc and that pilot signals are mapped at a ratio of one per two subcarriers.

If pilot signals are mapped at a ratio of one per two subcarriers, then the number of pilot signals is Nc/2. The first channel estimation portion 51 estimates a total of Nc/2 subcarrier channel values for every other subcarrier, and inputs the results to the second channel estimation portion 52.

The IFFT portion 52a having window width Nfft' of the second channel estimation portion 52 performs IFFT processing of the Nc/2 channel estimation values A, and outputs time-domain signals B. Nfft' is the smallest value of power of 2 which is larger than Nc/2; and Nfft'<Nfft.

The FFT interpolation portion 52d broadens the FFT window width of the signal B from Nfft' to Nfft, inserts 0's, and by this means outputs a signal C with time width Nfft. For example, the minimum position detection portion 52d-1 detects the time position at which the signal B is minimum, and the zero insertion portion 52d-2 inserts (Nfft-Nfft')/2 zeros on both sides centered on this position, for a total of (Nfft-Nfft') zeros, and generates a signal C with time width Nfft. Although depending on the communication environment, the time position at which the signal B is minimum is in the proximity of the center of the window width Nfft'. Hence the FFT interpolation portion 52d can be configured to use, as a simplified method, insertion of (Nfft-Nfft')/2 zeros on each side of the center position of the window width Nfft', for a total of (Nfft-Nfft') zeros inserted.

The FFT portion 52c performs FFT processing for Nfft points on the signal C after interpolation. By this means, a resolution of Nfft/Nfft' is obtained, and if Nfft/Nfft'=2, then channel estimation values can be generated in subcarriers to which pilot symbols have not been mapped.

Here, 0's are inserted in interpolation processing, so that similarly to the second embodiment, the precision of channel estimation values is different for each subcarrier. Hence the channel estimation value substitution portion 53 substitutes the channel estimation values of the first channel estimation portion 51 for the channel estimation values output from the second channel estimation portion 52 for the subcarriers where the precision of the latter is presumed to be poor. That is, for each subcarrier, the channel estimation value substitution portion 53 selects and outputs the channel estimation value output from the channel estimation portion for which the MSE is smaller. By this means, high-precision channel estimation is possible.

According to the third embodiment, even when pilot symbols are not mapped to all subcarriers, interpolation can be used to determine channel estimation values for all subcarriers, and moreover noise suppression can be performed to obtain high-precision channel estimation values.

(E) Fourth Embodiment

Figure 9:
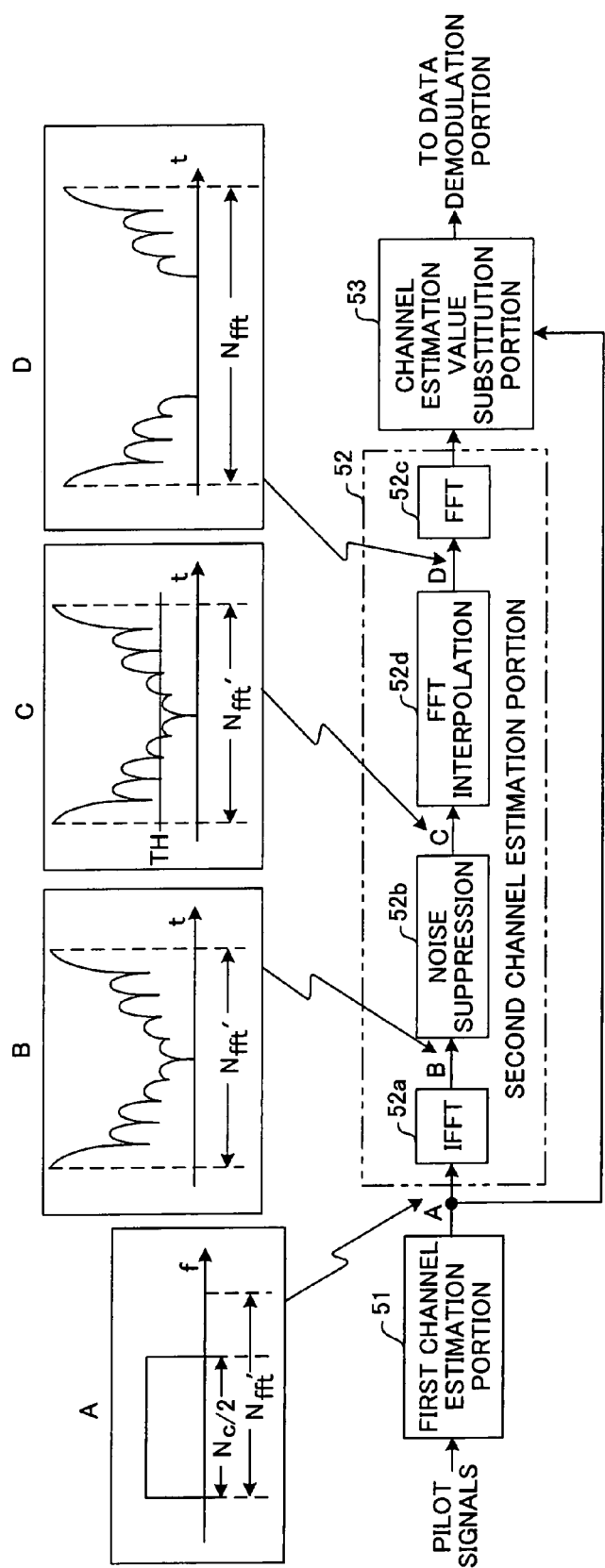
FIG. 9 shows the configuration of the channel estimation device of a fourth embodiment of the invention.

FIG. 9 shows the configuration of the channel estimation device of a fourth embodiment of the invention, and is an example combining the second embodiment and the third embodiment; portions which are the same as in these embodiments are assigned the same symbols. A difference from the third embodiment is that FFT interpolation is performed by the FFT interpolation portion 52d after noise suppression of time-domain signals B output from the IFFT portion 52a. The FFT interpolation portion 52d inserts (Nfft-Nfft')/2 zeros on both sides of the center position of the zero-portion of the signal C, for a total of (Nfft-Nfft') zeros, by noise suppression to generate Nfft time-domain signals D.

According to this fourth embodiment, advantageous results similar to those of the third embodiment can be obtained.

(F) Fifth Embodiment

In the above embodiments, the channel estimation value substitution portion 53 outputs the channel estimation values estimated by the second channel estimation portion 52 for subcarriers other than the subcarriers at both ends, and outputs the channel estimation values estimated by the first channel estimation portion 51 only for the subcarriers at both ends. In this case, measurements can be performed in advance to determine the number of subcarriers n at both ends as a fixed number.

Figure 10:
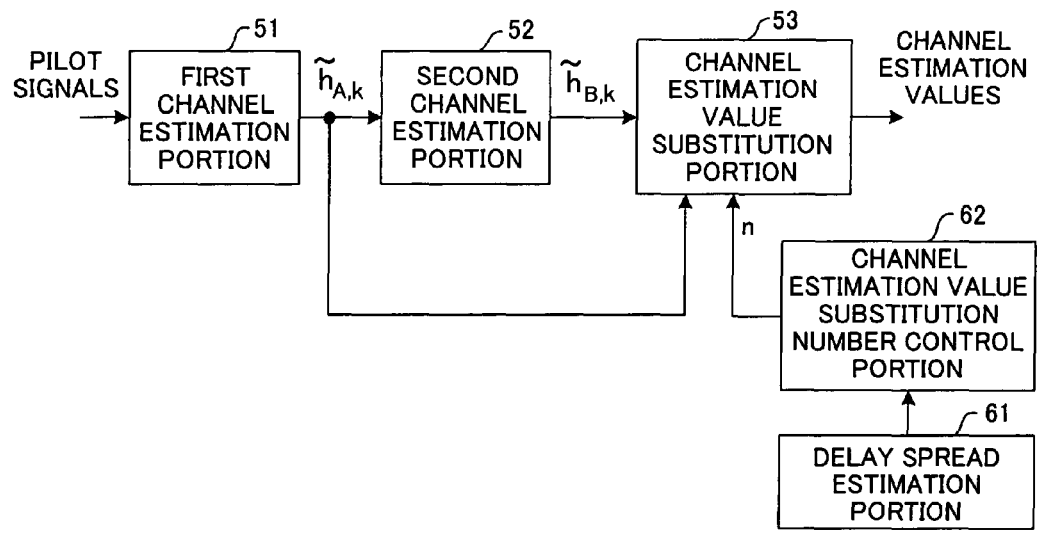
FIG. 10 shows the configuration of the channel estimation device of a fifth embodiment of the invention.

In the fifth embodiment, the number of subcarriers n is adaptively controlled based on the delay spread. FIG. 10 shows the configuration of the channel estimation device of the fifth embodiment; portions which are the same as in the first through fourth embodiments are assigned the same symbols.

Figure 11:
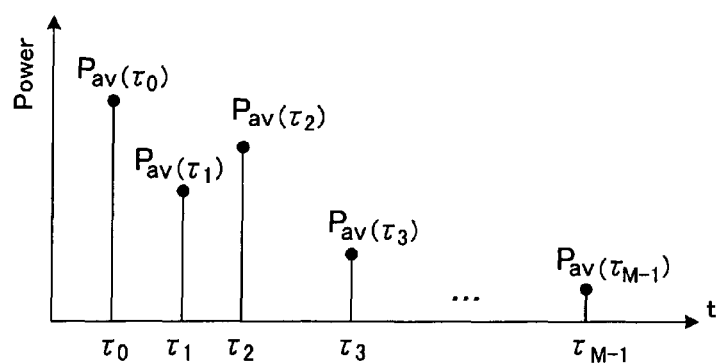
FIG. 11 explains delay spread.

The delay dispersion estimation portion 61 estimates the multipath delay dispersion. FIG. 11 explains delay dispersion, and shows a delay profile example when M paths exist. Here, $\tau_i$ is the ith path arrival time, and $P_{av}(\tau_i)$ is the average power at arrival time $\tau_i$. The delay dispersion is an index indicating the degree of spreading of delay amounts from the average, and is defined by equation (2) below.

$$\sqrt{\frac{1}{P_0}\sum_{\tau=\tau_0}^{\tau_{M-1}}(\tau-D)^2 P_{av}(\tau)} \quad (2)$$

Here $P_0$ is the total power of the delay profile, defined as follows.

$$P_0 = \sum_{\tau=\tau_0}^{\tau_{M-1}} P_{av}(\tau) \quad (3)$$

The average delay time D is defined as follows.

$$D = \frac{1}{P_0}\sum_{\tau=\tau_0}^{\tau_{M-1}}(\tau-\tau_0)P_{av}(\tau) \quad (4)$$

The delay dispersion estimation portion 61 computes the delay dispersion from equation (2), and the channel estimation value substitution number control portion 62 sets the number of subcarriers at both ends $n=n_1$ if the delay dispersion is equal to or less than a threshold, but sets $n=n_2$ ($n_1>n_2$) if the value is greater than the threshold, and inputs this number of carriers n to the channel estimation value substitution portion 53. The channel estimation value substitution portion 53 outputs the channel estimation value estimated by the second channel estimation portion 52 for subcarriers other than the n subcarriers on both ends, and outputs the channel estimation values estimated by the first channel estimation portion 51 for the n subcarriers at both ends.

Figure 12:
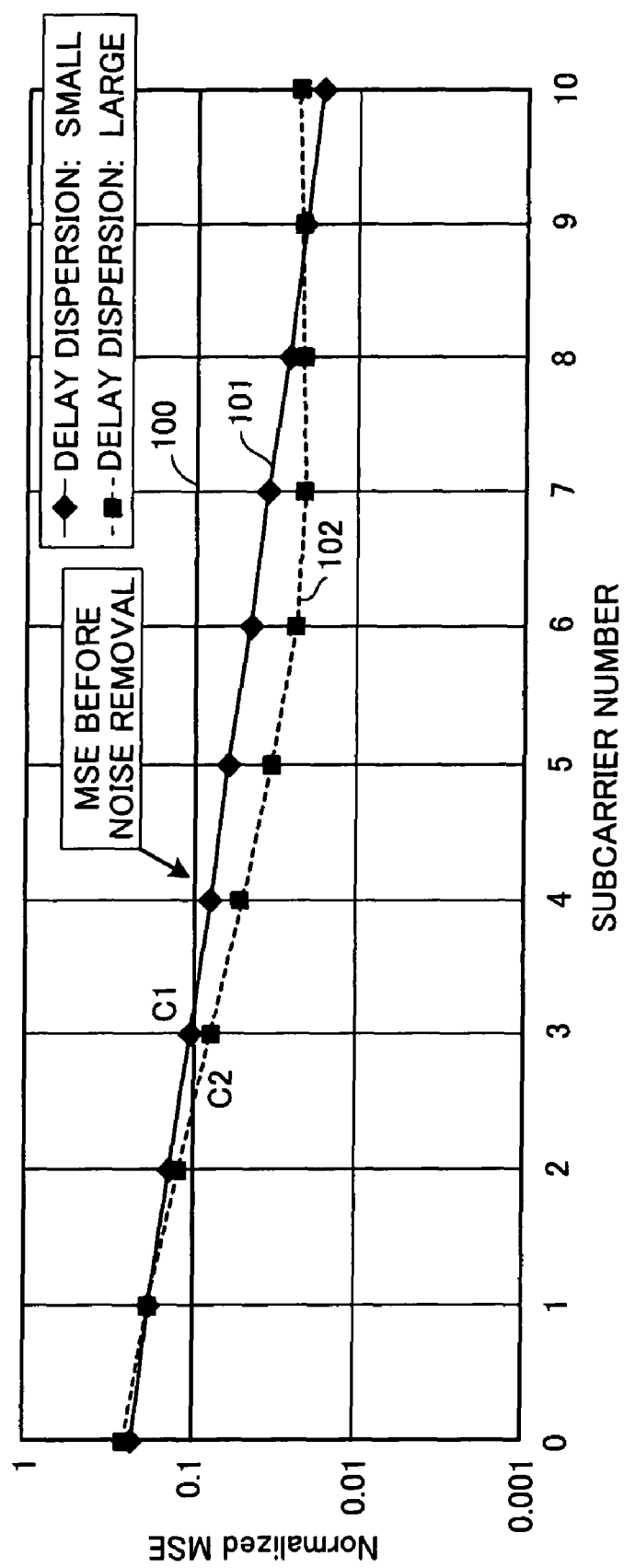
FIG. 12 explains operation of the fifth embodiment.
Figure 13:
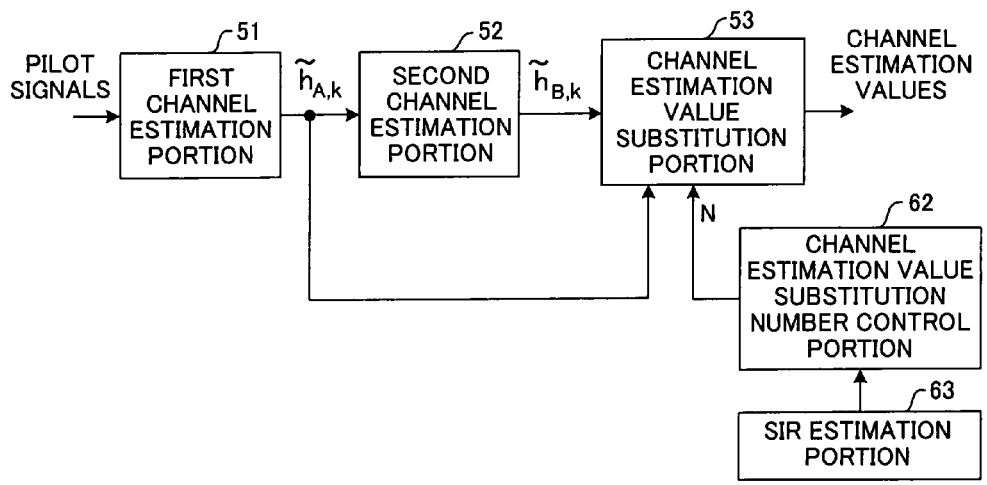
FIG. 13 is a first modified example of the fifth embodiment.

FIG. 12 shows the MSE characteristics of channel estimation values output by the first and second channel estimation portions 51, 52; 100 is the MSE characteristic of channel estimation values output by the first channel estimation portion 51, and 101, 102 are MSE characteristics of channel estimation values output by the second channel estimation portion 52. To facilitate the explanation, FIG. 12 is a characteristic diagram in which the subcarrier portion on the left-hand edge in the communication band is enlarged.

The first channel estimation portion 51 performs channel estimation by comparing the phase of the received pilot and the phase of a known pilot, and so the MSE characteristic 100 thereof does not depend on delay dispersion. On the other hand, the MSE characteristic of the channel estimation values output from the second channel estimation portion 52 depend on the delay dispersion; when there is little delay dispersion the MSE characteristic 101 results, and when delay dispersion is large, the MSE characteristic 102 results.

The MSE characteristic 100 of channel estimation values output by the first channel estimation portion 51 differs from the MSE characteristics 101, 102 of channel estimation values output by the second channel estimation portion 52. For this reason, if the delay dispersion is small, the channel estimation value substitution number control portion 62 determines the point of intersection C1 of the MSE characteristic 101 and the MSE characteristic 100, and inputs to the channel estimation value substitution portion 53 the number n (=4) of subcarriers at or below the intersection point (subcarrier numbers 0 to 3). If the delay dispersion is large, the channel estimation value substitution number control portion 62 determines the point of intersection C2 of the MSE characteristic 102 and the MSE characteristic 100, and inputs to the channel estimation value substitution portion 53 the number N (=3) of subcarriers at or below the intersection point (subcarrier numbers 0 to 2). In actuality, the channel estimation value substitution number control portion 62 stores in advance the correspondence between the delay dispersion magnitude and the number of carriers n at both ends, and outputs the prescribed number n according to the magnitude of the delay dispersion.

The channel estimation value substitution portion 53 outputs channel estimation values estimated by the second channel estimation portion 52 for subcarriers other than the n subcarriers at both ends, and outputs the channel estimation values estimated by the first channel estimation portion 51 for the n subcarriers at both ends.

The above is for a case in which the delay dispersion magnitude is divided into two ranges; but division into three or more ranges is also possible.

First Modified Example

In the fifth embodiment, the number of subcarriers n at both ends was determined adaptively based on the delay dispersion; but SIR of the reception device can be estimated, and based on this SIR the number of subcarriers n can be determined similarly to the method of the fifth embodiment. FIG. 12 shows the configuration of such a channel estimation device; in place of the delay dispersion estimation portion 61 of FIG. 10, a SIR estimation portion 63 is provided.

Second Modified Example

Figure 14:
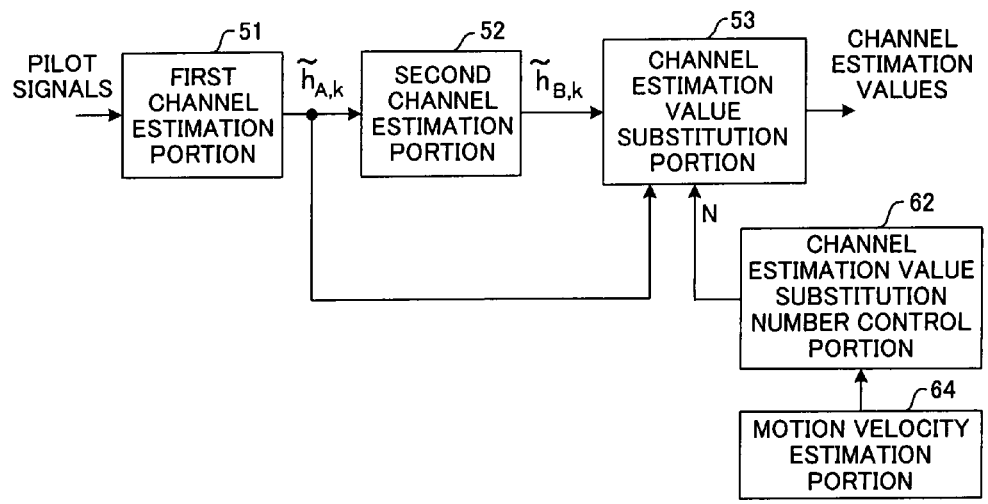
FIG. 14 is a second modified example of the fifth embodiment.

In the fifth embodiment, the number of subcarriers n at both ends was determined adaptively based on the delay dispersion; but the velocity V of motion of the reception device can be estimated, and based on this velocity the number of subcarriers n can be determined similarly to the method of the fifth embodiment. FIG. 14 shows the configuration of such a channel estimation device; in place of the delay dispersion estimation portion 61 of FIG. 10, a motion velocity estimation portion 64 is provided. The motion velocity estimation portion 64 is well-known (see for JP 10-79701A), and so details are omitted.

(G) Sixth Embodiment

In the above embodiment, a configuration was employed in which the first channel estimation portion 51 and second channel estimation portion 52 are connected in series; but a configuration can be employed in which two channel estimation portions which use different channel estimation methods to estimate channels are connected in parallel, and the channel estimation value output by one channel estimation portion is selectively output according to the subcarrier.

Figure 15:
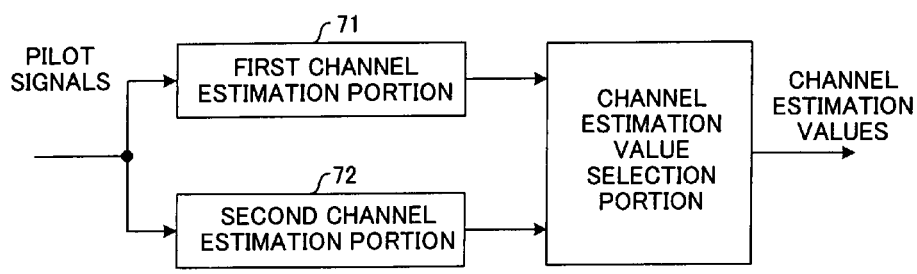
FIG. 15 shows the configuration of the channel estimation device of a sixth embodiment of the invention.

FIG. 15 shows the configuration of the channel estimation device of this sixth embodiment; the first channel estimation portion 71 adopts the channel estimation method described in either the first reference or second reference and so is, for example, a channel estimation portion with the configuration shown in FIG. 24. This first channel estimation portion 71 converts frequency-domain channel estimation values into the time domain, performs noise suppression processing in the time domain, and then returns the signals to the frequency domain and performs channel estimation. The second channel estimation portion 72 adopts the channel estimation method described in the third reference and so pilots are averaged in the subcarrier direction and in the time axis direction, and channels are estimated for each subcarrier.

Figure 16:
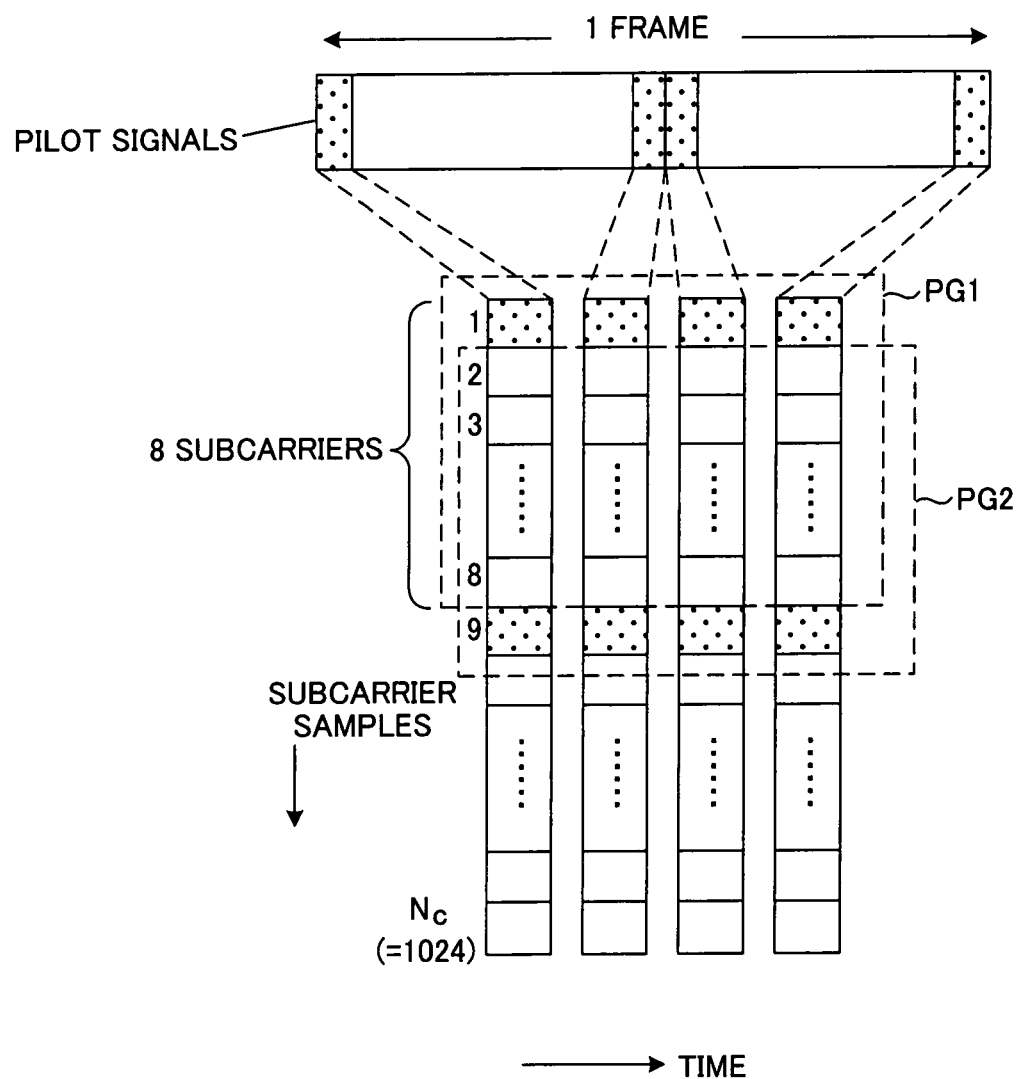
FIG. 16 explains the channel estimation method of the second channel estimation portion 72.

FIG. 16 explains the channel estimation method, of the second channel estimation portion 72; one frame comprises for example 32 OFDM symbols, and four pilot symbols (four OFDM pilot symbols) are dispersed and multiplexed in one frame. One pilot symbol comprises subcarrier samples in a number equal to the number of subcarriers (Nc, for example, 1024), and so on the receiving side, by monitoring the FFT output at the time of pilot reception, estimation of channels (amplitude characteristic, phase characteristic) for each subcarrier can be performed. The second channel estimation portion 72 forms one group of a total of 32 subcarrier samples, which are eight subcarrier samples in the frequency direction by four in the time direction, as indicated by PG1 in FIG. 16; average value of the FFT output for this group is taken to be the amplitude and phase of received pilot signal for the center subcarrier. Then, the amplitude and phase of the pilot signal is compared with the amplitude and phase of known pilot signal to estimate the subcarrier channel. The channel estimation value for the next subcarrier is obtained by forming a group of a total of 32 subcarrier samples, which are eight subcarrier samples in the frequency direction shifted by one subcarrier by four in the time direction, as indicated by PG2; the average values in this group PG2 is similarly calculated. In this way, upon averaging channel values, the effect of noise can be eliminated, and the S/N ratio can be improved.

Figure 17:
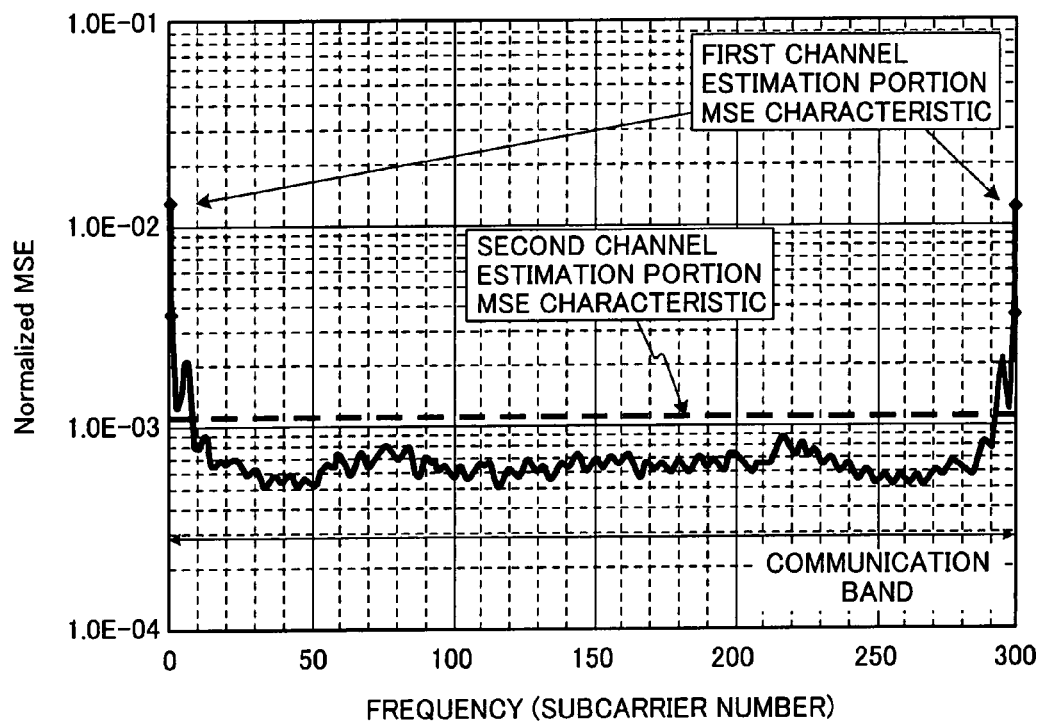
FIG. 17 shows the MSE characteristics of first and second channel estimation portions.

The MSE characteristic of the first channel estimation portion 71 is as indicated by the solid line in FIG. 17, and the MSE characteristic of the second channel estimation portion 72 is shown by the dashed line in FIG. 17; hence the channel estimation value selection portion 73 selects and outputs channel estimation values output from the first channel estimation portion 71 for subcarriers other than at both ends, and selects and outputs channel estimation values output from the second channel estimation portion 72 for subcarriers at both ends.

Figure 18:
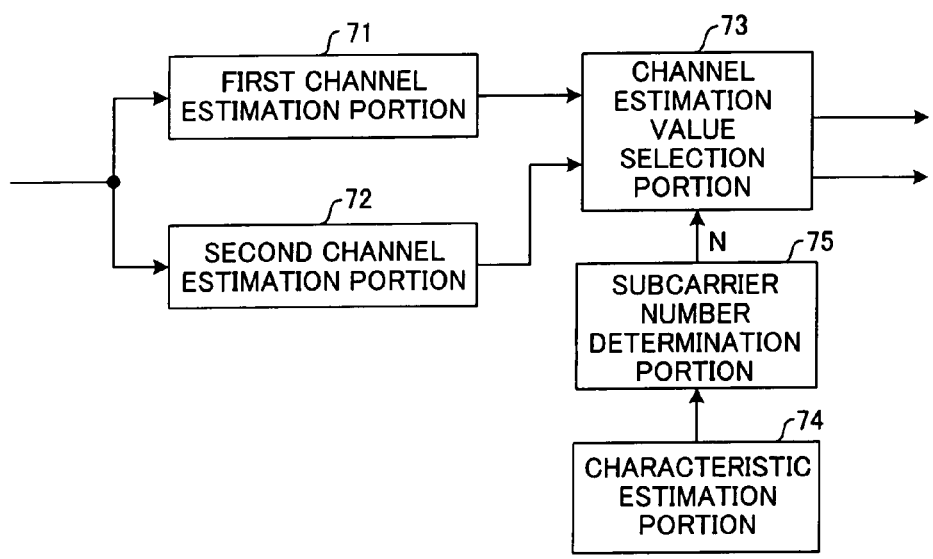
FIG. 18 is a modified example of the sixth embodiment.

In the sixth embodiment, the channel estimation value selection portion 73 can be configured to determine the number of subcarriers n at both ends through measurements performed in advance, and to select and output channel estimation values output from the second channel estimation portion 72 for the n subcarriers at both ends. Further, the channel estimation value selection portion 73 can also measure the delay dispersion, SIR, terminal motion velocity (fading frequency) and other parameters, similarly to FIG. 10 through FIG. 14, and adaptively determine n. FIG. 18 shows such a configuration; in addition to that of FIG. 15, a characteristic estimation portion 74 for estimation of the delay dispersion, SIR, terminal motion velocity (fading frequency), and other characteristics, and a subcarrier number determination portion 75 to determine the number of subcarriers at both ends based on such characteristic values, are provided.

(H) Seventh Embodiment

Figure 19:
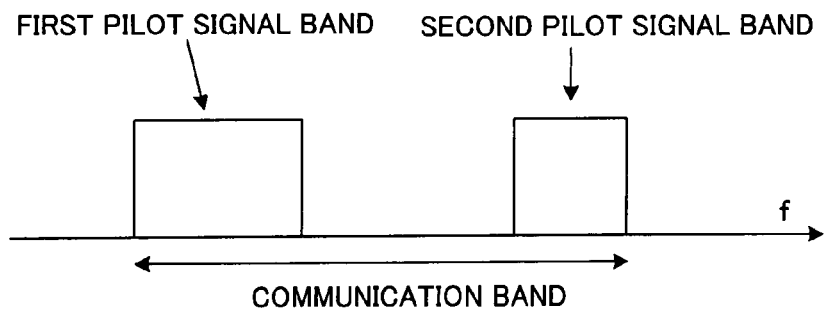
FIG. 19 explains a seventh embodiment.

In the above embodiments, pilot signals were mapped together to a certain single band; but as shown in FIG. 19, there are cases in which a first pilot signal group and a second pilot signal group are mapped to a plurality of (in the figure, two) bands at distant frequencies. Moreover, there are cases in which pilot signals are mapped using different methods to two or more bands. For example, in a first band pilot signals may be mapped continuously, while in a second band pilot signals may be mapped to every other subcarrier.

Figure 20:
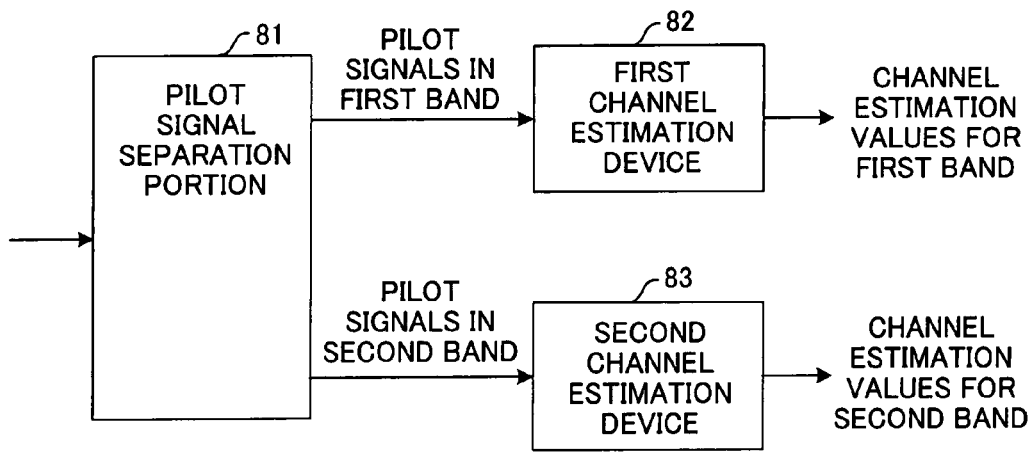
FIG. 20 shows the configuration of the channel estimation device of the seventh embodiment when channel estimation devices are provided for each band.
Figure 21:
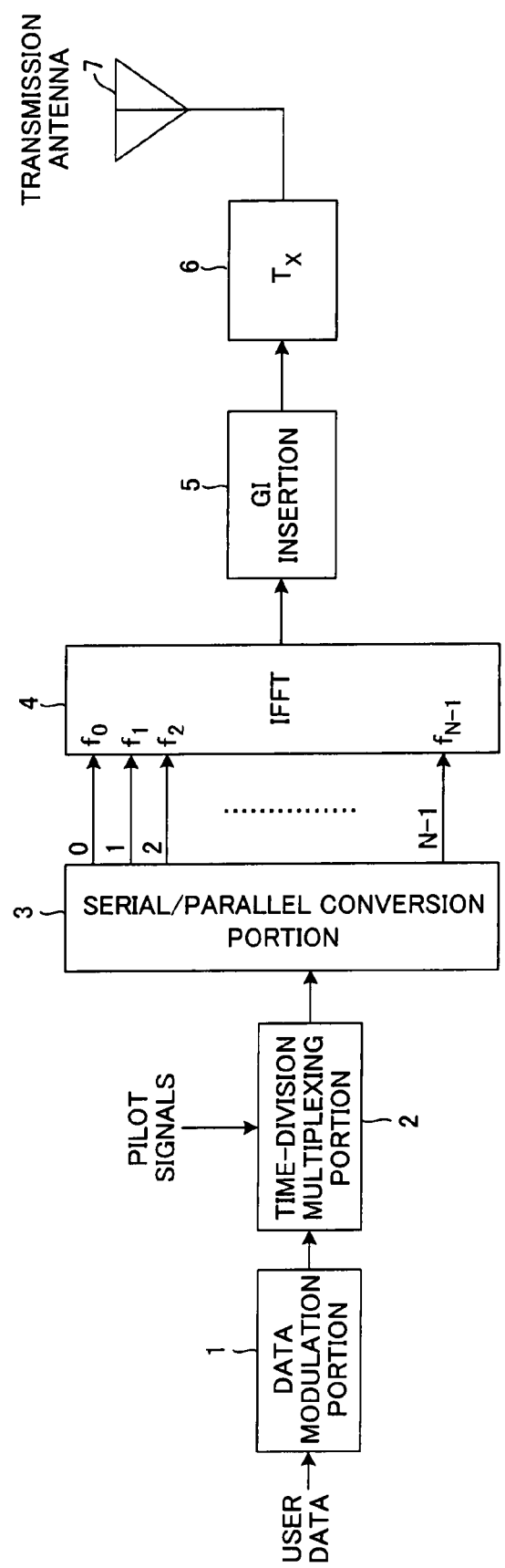
FIG. 21 shows the configuration of a transmission device in an OFDM communication system.
Figure 22:
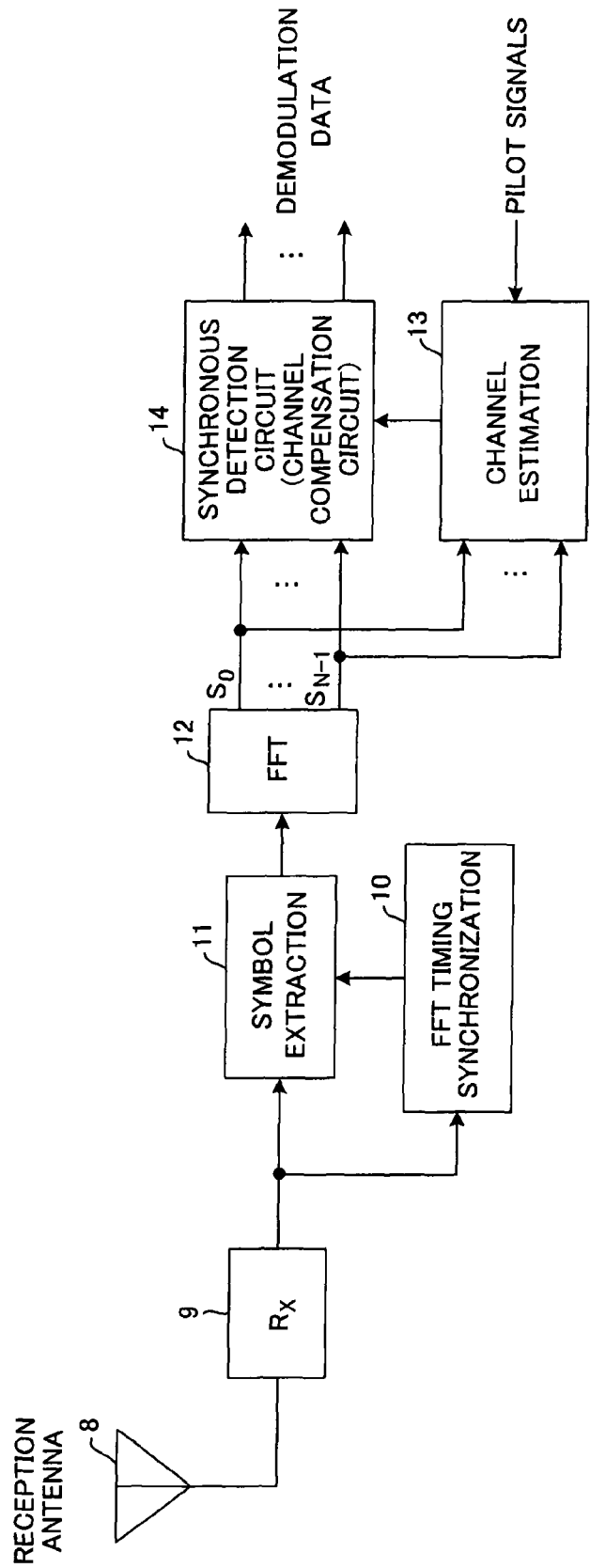
FIG. 22 shows the configuration of an OFDM reception device.
Figure 23:
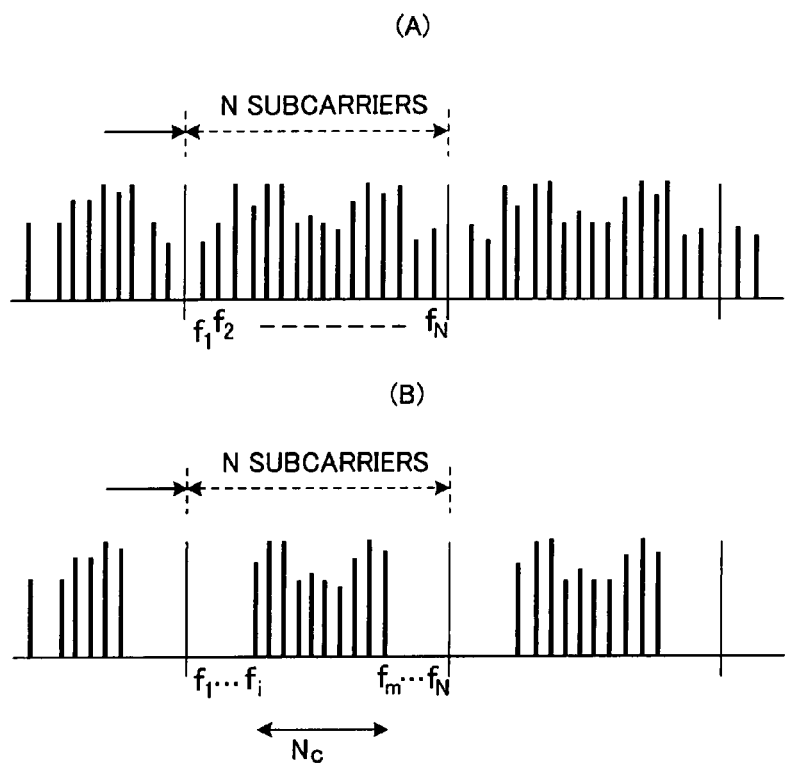
FIG. 23 shows the frequency spectrum when N-point IFFT processing is performed, with N data points as components of N subcarriers $f_1$ to $f_N$.

In such cases, a channel estimation device is provided for each band, and channels are estimated for all bands. FIG. 20 shows the configuration of channel estimation devices of this seventh embodiment; the pilot signal separation portion 81 separates the pilot signals for all bands into two band groups, which are the first and second groups. The first channel estimation device 82 comprises for example the configuration of the second embodiment shown in FIG. 6, and uses the first band pilot signals to estimate channels of subcarriers in the first band, while the second channel estimation device 83 also for example comprises the configuration of the second embodiment shown in FIG. 6, and uses the second band pilot signals to estimate channels of subcarriers in the second group and output the results.

In the above, channel estimation in OFDM wireless communication has been explained; however, this invention is not limited to OFDM, and can be applied in general to channel estimation in wireless communication using multiple carriers.

As many apparently widely different embodiments of the present invention can be made without departing from the spirit and scope thereof, it is to be understood that the invention is not limited to the specific embodiments thereof except as is defined in the appended claims.

What is claimed is:

1. A channel estimation device in wireless communication with use of a plurality of subcarriers for communication, comprising:
   a first channel estimation section which performs channel estimation for each subcarrier based on pilot signals mapped to each subcarrier;
   a second channel estimation section which further performs channel estimation for each subcarrier using channel estimation values estimated by the first channel estimation section; and
   a channel selection section which selects and outputs first and second channel estimation values estimated by said first and second channel estimation sections, according to the subcarrier,
   wherein said second channel estimation section includes:
      a first conversion section which converts channel estimation values estimated by the first channel estimation section into time-domain channel estimation values;
      a noise suppression section which suppresses noise included in the time-domain channel estimation values; and
      a second conversion section which converts noise-suppressed time-domain channel estimation values into frequency-domain channel estimation values, and
   wherein said channel selection section selects the channel estimation values estimated by said first channel estimation section as channel estimation values for subcarriers at both ends of an effective band, selects the channel estimation values estimated by said second channel estimation section as channel estimation values for subcarriers other than the subcarriers at both ends of the effective band, and outputs the selected values.

2. The channel estimation device according to claim 1, wherein said channel selection section holds constant the number of said subcarriers at both ends of the effective band.

3. The channel estimation device according to claim 1, wherein, when pilot signals are mapped to subcarriers in each band of a plurality of bands and transmitted, said channel estimation devices are provided for each of the bands.

4. A channel estimation device in wireless communication with use of a plurality of subcarriers for communication, comprising:
   a first channel estimation section which performs channel estimation for each subcarrier based on pilot signals mapped to each subcarrier;
   a second channel estimation section which further performs channel estimation for each subcarrier using channel estimation values estimated by the first channel estimation section; and
   a channel selection section which selects and outputs first and second channel estimation values estimated by said first and second channel estimation sections, according to the subcarrier,
   wherein said second channel estimation section includes:
      a first conversion section which converts channel estimation values estimated by the first channel estimation section into time-domain channel estimation values;
      a noise suppression section which suppresses noise included in the time-domain channel estimation values; and
      a second conversion section which converts noise-suppressed time-domain channel estimation values into frequency-domain channel estimation values, and
   wherein said channel selection section estimates a prescribed characteristic value, determines the number of subcarriers at both ends of the effective band based on the estimated characteristic value, selects, as the channel estimation values of subcarriers at both ends of the effective band in the number thus determined, the channel estimation values estimated by said first channel estimation section, selects, as the channel estimation values of subcarriers other than the subcarriers at both ends of the effective band, the channel estimation values estimated by said second channel estimation section, and outputs the selected values.

5. The channel estimation device according to claim 4, wherein said characteristic value is reception SIR, and the number of said subcarriers at both ends of the effective band is determined based on the estimated reception SIR.

6. The channel estimation device according to claim 4, wherein said characteristic value is multipath delay spread, and the number of said subcarriers at both ends of the effective band is determined based on the estimated delay spread.

7. The channel estimation device according to claim 4, wherein said characteristic value is mobile terminal motion velocity, and the number of said subcarriers at both ends of the effective band is determined based on the estimated motion velocity.

8. A channel estimation device in wireless communication in use of a plurality of subcarriers for communication, comprising:
   a first channel estimation section which performs channel estimation for each subcarrier based on a first channel estimation method using pilot signals mapped to each subcarrier;
   a second channel estimation section which performs channel estimation for each subcarrier based on a second channel estimation method which is different from said first channel estimation method, using pilot signals mapped to each subcarrier; and a channel selection section which selects and outputs first and second channel estimation values estimated by said first and second channel estimation sections, according to the subcarrier, wherein said channel selection section selects the channel estimation values estimated by said first channel estimation section as channel estimation values for a constant number of subcarriers at both ends of an effective band, selects the channel estimation values estimated by said second channel estimation section as channel estimation values for subcarriers other than the subcarriers at both ends of the effective band, and outputs the selected values.

9. A channel estimation device in wireless communication in use of a plurality of subcarriers for communication, comprising:

a first channel estimation section which performs channel estimation for each subcarrier based on a first channel estimation method using pilot signals mapped to each subcarrier;

a second channel estimation section which performs channel estimation for each subcarrier based on a second channel estimation method which is different from said first channel estimation method, using pilot signals mapped to each subcarrier; and a channel selection section which selects and outputs first and second channel estimation values estimated by said first and second channel estimation sections, according to the subcarrier, wherein said channel selection section estimates a prescribed characteristic value, determines the number of subcarriers at both ends of the effective band based on the estimated characteristic value, selects, as the channel estimation values of subcarriers at both ends of the effective band in the number thus determined, the channel estimation values estimated by said first channel estimation section, selects, as the channel estimation values of subcarriers other than the subcarriers at both ends of the effective band, the channel estimation values estimated by said second channel estimation section, and outputs the selected values.

10. The channel estimation device according to claim 9, wherein said characteristic value is reception SIR, and the number of said subcarriers at both ends of the effective band is determined based on the estimated reception SIR.

11. The channel estimation device according to claim 9, wherein said characteristic value is multipath delay spread, and the number of said subcarriers at both ends of the effective band is determined based on the estimated delay spread.

12. The channel estimation device according to claim 9, wherein said characteristic value is mobile terminal motion velocity, and the number of said subcarriers at both ends of the effective band is determined based on the estimated motion velocity.

13. A channel estimation method performed by a channel estimation device in wireless communication in which a plurality of subcarriers are used for communication, comprising:

performing first channel estimation for each subcarrier based on a first channel estimation method using pilot signals mapped to each subcarrier;

performing second channel estimation for each subcarrier based on a second channel estimation method which is different from said first channel estimation method, using pilot signals mapped to each subcarrier; and selecting and outputting the channel estimation values estimated by said first channel estimation as channel estimation values for a constant number of subcarriers at both ends of an effective band, while selecting and outputting the channel estimation values estimated by said second channel estimation as channel estimation values for subcarriers other than the subcarriers at both ends of the effective band.

14. A channel estimation method performed by a channel estimation device in wireless communication in which a plurality of subcarriers are used for communication, comprising:

performing a first channel estimation for each subcarrier based on pilot signals mapped to each subcarrier and outputting a first channel estimation value for each subcarrier;

performing a second channel estimation for each subcarrier using the channel estimation values estimated by the first channel estimation and outputting a second channel estimation value for each subcarrier; and selecting and outputting the first and second channel estimation values estimated by said first and second channel estimation, according to the subcarrier, wherein said second channel estimation is performed by:
converting the first channel estimation values estimated by the first channel estimation into time-domain channel estimation values;
suppressing noise included in the time-domain channel estimation values; and
converting noise-suppressed time-domain channel estimation values into frequency-domain channel estimation values as the second channel estimation values, and wherein the first and second channel estimation values are selected and output by:
selecting the first channel estimation values estimated by said first channel estimation as channel estimation values for subcarriers at both ends of an effective band;
selecting the second channel estimation values estimated by said second channel estimation as channel estimation values for subcarriers other than the subcarriers at both ends of the effective band; and
outputting the selected values.

15. A channel estimation method performed by a channel estimation device in wireless communication in which a plurality of subcarriers are used for communication, comprising:

performing a first channel estimation for each subcarrier based on pilot signals mapped to each subcarrier and outputting a first channel estimation value for each subcarrier;

performing a second channel estimation for each subcarrier using the channel estimation values estimated by the first channel estimation and outputting a second channel estimation value for each subcarrier; and selecting and outputting the first and second channel estimation values estimated by said first and second channel estimation, according to the subcarrier, wherein said second channel estimation is performed by:
converting the first channel estimation values estimated by the first channel estimation into time-domain channel estimation values;
suppressing noise included in the time-domain channel estimation values; and
converting noise-suppressed time-domain channel estimation values into frequency-domain channel estimation values as the second channel estimation values, and wherein the first and second channel estimation values are selected and output by:
estimating a prescribed characteristic value;

determining the number of subcarriers at both ends of the effective band based on the estimated characteristic value;

selecting, as the channel estimation values of subcarriers at both ends of the effective band in the number thus determined, the first channel estimation values estimated by said first channel estimation;

selecting, as the channel estimation values of subcarriers other than the subcarriers at both ends of the effective band, the second channel estimation values estimated by said second channel estimation; and outputting the selected values.

16. A channel estimation method performed by a channel estimation device in wireless communication in which a plurality of subcarriers are used for communication, comprising:

performing channel estimation for each subcarrier based on a first channel estimation method using pilot signals mapped to each subcarrier and outputting a first channel estimation value for each subcarrier;

performing channel estimation for each subcarrier based on a second channel estimation method which is different from said first channel estimation method, using pilot signals mapped to each subcarrier and outputting a second channel estimation value for each subcarrier; and selecting and outputting the first and second channel estimation values estimated based on said first and second channel estimation methods, according to the subcarrier, wherein the first and second channel estimation values are selected and output by:

selecting the first channel estimation values estimated based on said first channel estimation method as channel estimation values for a constant number of subcarriers at both ends of an effective band;

selecting the second channel estimation values estimated based on said second channel estimation method as channel estimation values for subcarriers other than the subcarriers at both ends of the effective band; and outputting the selected values.

17. A channel estimation method performed by a channel estimation device in wireless communication in which a plurality of subcarriers are used for communication, comprising:

performing channel estimation for each subcarrier based on a first channel estimation method using pilot signals mapped to each subcarrier and outputting a first channel estimation value for each subcarrier;

performing a second channel estimation for each subcarrier based on a second channel estimation method which is different from said first channel estimation method, using pilot signals mapped to each subcarrier and outputting a second channel estimation value for each subcarrier; and selecting and outputting the first and second channel estimation values estimated based on said first and second channel estimation methods, according to the subcarrier, wherein the first and second channel estimation values are selected and output by:

estimating a prescribed characteristic value;

determining the number of subcarriers at both ends of the effective band based on the estimated characteristic value;

selecting, as the channel estimation values of subcarriers at both ends of the effective band in the number thus determined, the first channel estimation values estimated based on said first channel estimation method;

selecting, as the channel estimation values of subcarriers other than the subcarriers at both ends of the effective band, the second channel estimation values estimated based on said second channel estimation method; and outputting the selected values.

* * * * *